US012563358B2

(12) United States Patent
Hu et al.

(10) Patent No.: US 12,563,358 B2
(45) Date of Patent: Feb. 24, 2026

(54) SOUND PROCESSING METHOD AND APPARATUS THEREOF

(71) Applicant: Beijing Honor Device Co., Ltd., Beijing (CN)

(72) Inventors: Beibei Hu, Beijing (CN); Jianfeng Xu, Beijing (CN)

(73) Assignee: Beijing Honor Device Co., Ltd., Beijing (CN)

( * ) Notice: Subject to any disclaimer, the term of this patent is extended or adjusted under 35 U.S.C. 154(b) by 278 days.

(21) Appl. No.: 18/030,446

(22) PCT Filed: Jan. 22, 2022

(86) PCT No.: PCT/CN2022/073338
§ 371 (c)(1),
(2) Date: Apr. 5, 2023

(87) PCT Pub. No.: WO2022/267468
PCT Pub. Date: Dec. 29, 2022

(65) Prior Publication Data
US 2024/0031766 A1 Jan. 25, 2024

(30) Foreign Application Priority Data
Jun. 24, 2021 (CN) ......................... 202110705314.1

(51) Int. Cl.
*H04S 7/00* (2006.01)
*H04S 1/00* (2006.01)

(52) U.S. Cl.
CPC .............. *H04S 7/307* (2013.01); *H04S 1/007* (2013.01); *H04S 7/304* (2013.01); *H04S 2420/01* (2013.01)

(58) Field of Classification Search
CPC ........... H04S 7/307; H04S 1/007; H04S 7/304
See application file for complete search history.

(56) References Cited

U.S. PATENT DOCUMENTS 8,212,136 B2 7/2012 Shirai et al.
8,278,546 B2 10/2012 Jung
9,344,827 B2 5/2016 Zhu et al.
(Continued)

FOREIGN PATENT DOCUMENTS

CN 101394906 A 3/2009
CN 103885663 A 6/2014
(Continued)

*Primary Examiner* — Olisa Anwah
(74) *Attorney, Agent, or Firm* — WOMBLE BOND DICKINSON (US) LLP

(57) ABSTRACT

This application provides a sound processing method and apparatus thereof. When the method is implemented, an electronic device such as a mobile phone may learn a device action and a music material matching the action. In this way, a user may drive the electronic device to perform an action through his own action (such as shaking his head, shaking his hands, or the like) when playing audio. The electronic device may recognize the actions through movement detection, and determine a music material matching the action according to a preset association relationship, so as to add an entertaining interactive effect to the audio being played, increase fun of an audio playing process, and meet a requirement of the user interacting with the audio being played.

19 Claims, 14 Drawing Sheets

(56) References Cited

U.S. PATENT DOCUMENTS

| | | | |
|---|---|---|---|
| 10,567,900 | B2 | 2/2020 | Tanaka et al. |
| 2015/0170665 | A1 | 6/2015 | Gundeti et al. |
| 2017/0047053 | A1 * | 2/2017 | Seo ........................ G10H 1/053 |
| 2017/0161381 | A1 | 6/2017 | Hsu et al. |
| 2020/0368616 | A1 | 11/2020 | Delamont |

FOREIGN PATENT DOCUMENTS

| | | | |
|---|---|---|---|
| CN | 104640029 | A | 5/2015 |
| CN | 105913863 | A | 8/2016 |
| CN | 106572425 | A | 4/2017 |
| CN | 108242238 | A | 7/2018 |
| CN | 108353240 | A | 7/2018 |
| CN | 111050269 | A | 4/2020 |
| CN | 111405416 | A | 7/2020 |
| CN | 111930335 | A | 11/2020 |
| CN | 112221137 | A | 1/2021 |
| CN | 112507161 | A | 3/2021 |
| CN | 113596241 | A | 11/2021 |
| EP | 1752865 | B1 | 5/2016 |

* cited by examiner

SOUND PROCESSING METHOD AND APPARATUS THEREOF

CROSS-REFERENCE TO RELATED APPLICATIONS

This application is a national stage of International Application No. PCT/CN2022/073338, filed on Jan. 22, 2022, which claims priority to Chinese Patent Application No. 202110705314.1, filed on Jun. 24, 2021. The disclosures of both of the aforementioned applications are hereby incorporated by reference in their entireties.

TECHNICAL FIELD

This application relates to the field of terminals, and in particular, to a sound processing method and apparatus thereof.

BACKGROUND

Currently, when a user plays audio by using a smart terminal, a terminal device generally simply performs audio playback. The user cannot perform processing on the audio being played, and therefore the user cannot obtain an audio-based interactive experience.

SUMMARY

This application provides a sound processing method. When the method is implemented, the electronic device may recognize an action of one or more electronic devices when a user plays audio through movement detection, and determine a music material matching the action according to a preset association relationship, so as to add an entertaining interactive effect to the audio being played, increase fun of an audio playing process, and meet a requirement of the user interacting with the audio being played.

According to a first aspect, this application provides a sound processing method, applicable to a first electronic device, and the method including: playing first audio; detecting a first action of a user; obtaining second audio in response to the first action, where the second audio has a correspondence with the first action, and a correspondence is pre-configured by the user; performing processing on the first audio according to the second audio to obtain third audio, where the third audio is different from the first audio, and the third audio is associated with the first audio; and playing third audio.

When the method provided in the first aspect is implemented, the first electronic device may recognize an action of a detected electronic device when the user plays music. When the detected electronic device performs a preset action, the first electronic device may determine audio matching the action, add the audio to the music being played, and play the audio together with the music being played.

With reference to some embodiments of the first aspect, in some embodiments, second audio is audio that is preset and is used for adding a background sound effect to the first audio.

When the method provided in the foregoing embodiment is implemented, the first electronic device may add the audio having an entertaining interactive effect to the music being played, so as to meet a requirement of the user interacting with the music being played.

With reference to some embodiments of the first aspect, in some embodiments, after the obtaining second audio, the method further includes: performing processing on second audio to obtain a changeable stereo playback effect, the changeable stereo playback effect refers to that the stereo playback effect is changeable with a relative position between the user and the first electronic device; and the performing processing on the first audio according to the second audio to obtain third audio specifically includes: superimposing the second audio having the changeable stereo playback effect and the first audio to obtain the third audio.

When the method provided in the foregoing embodiment is implemented, the first electronic device may perform space rendering processing on the added audio having an entertaining interactive effect, so that a general interactive audio has a changeable space three-dimensional surround effect.

With reference to some embodiments of the first aspect, in some embodiments, the performing processing on the second audio to obtain a changeable stereo playback effect specifically includes: obtaining a position of the first electronic device relative to the user; determining a first parameter according to the position, where the first parameter is obtained from a head related transform function database, and is used for adjusting parameters of a left sound channel playback effect and a right sound channel playback effect of the second audio; and multiplying the second audio by the first parameter according to a frequency to obtain the second audio having the changeable stereo playback effect.

When the method provided in the foregoing embodiment is implemented, the first electronic device may determine parameters for performing space rendering processing on the second audio through the position of the first electronic device relative to the user, so as to confirm audio data of a left sound channel and a right sound channel of the second audio. In this way, a sound in a left sound channel and a sound in a right sound channel heard by a left ear and a right ear of the user are different, thereby forming a stereo playback effect. As the relative position changes, the parameters of space rendering processing also continuously change. In this way, the added audio having the entertaining interactive effect heard by the user is also three-dimensional, and may change as the relative position between the first electronic device and the user changes, thereby enhancing an immersive experience of the user.

With reference to some embodiments of the first aspect, in some embodiments, the performing processing on the first audio according to the second audio to obtain third audio specifically includes: superimposing the second audio of a first duration on a first interval of the first audio to obtain the third audio, where a duration of the first interval is equal to the first duration. The playing the third audio specifically includes: playing audio in the first interval of the third audio.

When the method provided in the foregoing embodiment is implemented, the first electronic device may play the second audio while playing the first audio after detecting a preset device action. In this way, the user may immediately hear that the audio being played is added an interactive audio to which an entertaining effect is added.

With reference to some embodiments of the first aspect, in some embodiments, the first action includes a plurality of second actions, the plurality of second actions are a combination of actions performed by a plurality of second electronic devices at a same moment, the second audio includes a plurality of pieces of fourth audio, and the plurality of pieces of fourth audio respectively correspond to the plurality of second actions.

When the method provided in the foregoing embodiment is implemented, the first electronic device may detect an action obtained by a combination of actions performed by a plurality of electronic devices. In this way, diversity of the detected actions may be increased, and more options may be provided for the user. An action formed by a combination of actions performed by a plurality of second electronic devices may also more accurately describe a body action of the user.

With reference to some embodiments of the first aspect, in some embodiments, before the playing first audio, the method further includes: displaying a first user interface, where one or more icons and controls are displayed on the first user interface, the icons include a first icon, and the controls include a first control; detecting a first operation performed by the user on the first control; and confirming that the second audio is associated with the first action in response to the first operation.

When the method provided in the foregoing embodiment is implemented, the user may pre-configure a matching relationship between a device action and audio having an entertaining interactive effect in the first electronic device.

With reference to some embodiments of the first aspect, in some embodiments, the obtaining second audio specifically includes: querying a storage table to determine the second audio, where one or more pieces of audio and actions corresponding to the pieces of audio are recorded in the storage table; and the one or more pieces of audio include the second audio, and the second audio corresponds to the first action in the storage table; and obtaining the second audio from a local database or a server.

When the method provided in the foregoing embodiment is implemented, a preset music material in the storage table may be stored in local memory of the first electronic device. In this way, when the music material needs to be used, the first electronic device may directly obtain the music material from a local storage space. The first electronic device may also directly obtain the music material preset in the storage table from the server through the internet. In this way, a storage space of the first electronic device may be reduced.

With reference to some embodiments of the first aspect, in some embodiments, the second audio includes: any one of an instrument sound, an animal sound, an ambient sound, or a recording.

When the method provided in the foregoing embodiment is implemented, the first electronic device may add the different sound to the music being played, such as an instrument sound, an animal sound, an ambient sound, or a recording.

With reference to some embodiments of the first aspect, in some embodiments, the instrument sound includes: any one of a snare drum sound, a bass drum sound, a maracas sound, a piano sound, an accordion sound, a trumpet sound, a tuba sound, a flute sound, a cello sound, or a violin sound; the animal sound includes: any one of birdsong, croak, a chirp, a miaow, a bark, baa, a moo, an oink, a neigh, or a cluck; and the ambient sound includes: any one of a wind sound, a rain sound, thunder, a running water sound, an ocean wave sound, or a waterfall sound.

With reference to some embodiments of the first aspect, in some embodiments, the second electronic device includes a headset connected to the first electronic device, and the first action includes a head action of the user detected by the headset.

When the method provided in the foregoing embodiment is implemented, the first electronic device may determine a head movement of the user by detecting a device movement of the headset. When the user shakes his head following the music being played, the first electronic device may determine that the user performs the action of shaking his head through a movement of the headset.

With reference to some embodiments of the first aspect, in some embodiments, the head action includes any one of head displacement or head rotation; and the head displacement includes: any one of moving leftward, moving rightward, moving upward, or moving downward, and the head rotation includes any of turning leftward, turning rightward, raising head, or lowering head.

With reference to some embodiments of the first aspect, in some embodiments, the second electronic device includes a watch connected to the first electronic device, and the first action includes a hand action of the user detected by the watch.

When the method provided in the foregoing embodiment is implemented, the first electronic device may determine a hand movement of the user by detecting a device movement of the watch. When the user shakes his hand following the music being played, the first electronic device may determine that the user performs an action of shaking his hand through a movement of the watch.

With reference to some embodiments of the first aspect, in some embodiments, the hand action includes any one of hand displacement or hand rotation; and the hand displacement includes: any one of moving leftward, moving rightward, moving upward, or moving downward, and the hand rotation includes any of turning leftward, turning rightward, raising hand, or lowering hand.

With reference to some embodiments of the first aspect, in some embodiments, the second electronic device includes a headset and a watch that are connected to the first electronic device, and the first action includes a combination of a head action and a hand action of the user detected by the headset and the watch.

When the method provided in the foregoing embodiment is implemented, the first electronic device may detect actions formed by a combination of a head action and a hand action of the user through the headset and the watch, thereby increasing diversity of action types and providing the user with more options. The actions formed by the combination of the head action and the hand action of the user may also more accurately describe a body action of the user.

According to a second aspect, this application provides an electronic device, including one or more processors and one or more memories, where the one or more memories are coupled to the one or more processors, the one or more memories are configured to store computer program code, the computer program code includes computer instructions, and the computer instructions, when executed by the one or more processors, cause the electronic device to perform the method described according to the first aspect and any possible implementation of the first aspect.

According to a third aspect, this application provides a computer-readable storage medium, including instructions, where the instructions, when run on an electronic device, cause the electronic device to perform the method described according to the first aspect and any possible implementation in the first aspect.

According to a fourth aspect, this application provides a computer program product including instructions, where the computer program product, when run on an electronic device, causes the electronic device to perform the method described according to the first aspect and any possible implementation in the first aspect.

It may be understood that the electronic device provided in the second aspect, the computer storage medium provided in the third aspect, and the computer program product provided in the fourth aspect are all configured to perform the method provided in this application. Therefore, for beneficial effects that can be achieved, reference may be made to the beneficial effects in the corresponding method, and details are not repeated herein again.

DESCRIPTION OF EMBODIMENTS

Figure 1:
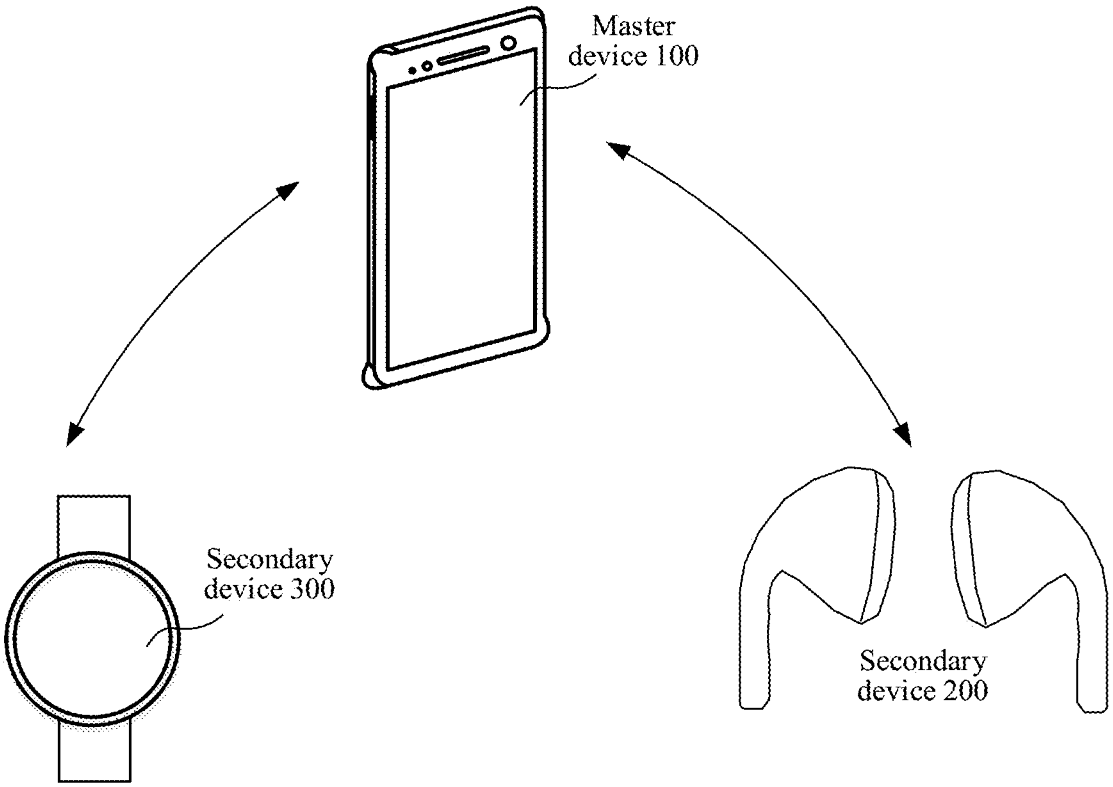
FIG. 1 is a diagram of a scenario of a sound processing method according to an embodiment of this application.

Terms used in the following embodiments of this application are only intended to describe particular embodiments, and are not intended to limit this application.

When a mobile phone is connected to a wireless headset to play audio, the wireless headset may determine a distance between a left ear and a right ear of a user and the mobile phone by tracking a head action of the user, so as to adjust a volume of the audio outputted in the left ear and the right ear, thereby meeting an immersive surround sound experience of the user. However, the processing is only limited to adjusting strength of original audio outputted in the left ear and the right ear to obtain a three-dimensional surround sound effect, and cannot meet an effect that a user interacts with the audio in a process of playing the audio.

To meet a requirement of the user interacting with the audio being played, increase an entertaining effect of an audio playing process, and improve a user experience, an embodiment of this application provides a sound processing method.

The method may be applicable to an electronic device such as a mobile phone. When the method is implemented, the electronic device such as the mobile phone may establish a connection between a device action and a music material. After recognizing a preset device action, the electronic device may confirm a music material associated with the device action, then fuse a music material on which three-dimensional space rendering processing is performed with the audio being played by the user, and then output.

The device action refers to changes in a position and a shape of the electronic device caused by user movements, including a displacement action and/or a rotation action. The displacement action refers to an action generated due to a change generated at a current position of the electronic device relative to a position at a previous moment, including moving leftward, moving rightward, moving upward, or moving downward. The electronic device may determine whether the electronic device performs any of the displacement actions through data collected by an acceleration sensor. The rotation action refers to an action generated by a change of a direction of the electronic device at a current moment relative to a direction at a previous moment, including turning leftward, turning rightward, turning upward, or turning downward. The electronic device may determine whether the electronic device performs any of the rotation actions through data collected by a gyroscope sensor. It may be understood that if more detailed classification criteria are adopted, the displacement action and the rotation action may further include more types.

Optionally, the device action further includes a combined action. The combined action refers to a combination of actions performed by a plurality of electronic devices at a same moment. For example, at the same moment, a first detected electronic device performs an action of moving leftward, and a second detected electronic device performs an action of turning leftward. In this case, an action combined by moving leftward and turning leftward is a combined action.

The music material refers to preset audio data having specific content, including an instrument sound, an animal sound, an ambient sound, a user-defined recording file, or the like. The instrument sound includes a snare drum sound, a bass drum sound, a maracas sound, a piano sound, an accordion sound, a trumpet sound, a tuba sound, a flute sound, a cello sound, or a violin sound. The animal sound include birdsong, croak, a chirp, a miaow, a bark, baa, a moo, an oink, a neigh, or a cluck. The ambient sound includes a wind sound, a rain sound, thunder, a running water sound, an ocean wave sound, or a waterfall sound.

Three-dimensional space rendering (three-dimensional space rendering) refers to performing processing on audio data by using a head related transfer function (Head Related Transfer Function, HRTF), so that the processed audio data may have a three-dimensional surround effect on a left and a right ear of the user. In subsequent embodiments, the head related transformation function will be referred to as a head function for short. A module that processes the audio data using the head function is referred to as a head function filter.

When the method is implemented, the user, when playing audio, may drive the electronic device to move through his own movement (such as shaking his head, shaking his hand, or the like), so as to add an entertaining interactive effect to the audio being played, increase fun of an audio playing process, and meet a requirement of the user interacting with the audio being played.

FIG. 1 exemplarily shows a system 10 for implementing the sound processing method. Scenarios involved in implementing the method will be introduced below with reference to the system 10.

As shown in FIG. 1, the system 10 may include a master device 100 and a secondary device 200.

The master device 100 may be configured to obtain and process audio files. The master device 100 may be connected to the secondary device 200, and play an audio signal on the secondary device 200 side by using a playback capability of a sound generating unit provided by the secondary device 200. That is, an audio file parsing task is performed on the master device 100 side, and an audio signal playing task is performed on the secondary device 200 side. A scenario in which the system 10 includes the master device 100 and the secondary device 200 may be referred to as a first scenario.

An example in which the master device 100 shown in FIG. 1 is a type of electronic device such as a mobile phone is used, and an example in which the secondary device 200 is a type of electronic device such as a headset is used. Not limited to the mobile phone, the master device 100 may further include a tablet computer, a personal computer (personal computer, PC), a personal digital assistant (personal digital assistant, PDA), a smart wearable electronic device, an augmented reality (augmented reality, AR) device, a virtual reality (virtual reality, VR) device, or the like. The electronic device may also be other portable electronic devices, such as a laptop computer (Laptop). It should be further understood that in some other embodiments, the electronic device may also be not a portable electronic device, but a desktop computer, or the like. An exemplary embodiment of the electronic device includes, but is not limited to, a portable electronic device running iOS®, Android®, Harmony®, Windows®, Linux, or another operating system.

A connection between the master device 100 and the secondary device 200 may be a wired connection or a wireless connection. The wireless connection includes but is not limited to a wireless fidelity (wireless fidelity, Wi-Fi) connection, a Bluetooth connection, an NFC connection, and a ZigBee connection. If there is a wired connection between the master device 100 and the secondary device 200, a device type of the secondary device 200 may be a wired headset; and if there is a wireless connection between the master device 100 and the secondary device 200, a device type of the secondary device 200 may be a wireless headset, including a headset wireless headset, a neck-mounted wireless headset, and a true wireless headset (True wireless headset, TWS). This is not limited in this embodiment of this application.

In a first scenario, a detection object of the master device 100 includes: the master device 100 and/or the secondary device 200. That is, in the first scenario, the detection object of the master device 100 may only include the master device 100; may also only include the secondary device 200; and may further include both the master device 100 and the secondary device 200. A specific detection object of the master device 100 may be set by a user.

There is an association relationship between a device action and a music material in a record in the master device 100. When the master device 100 and the secondary device 200 play audio, the master device 100 may detect a device action of the electronic device in real time. When a specific device action is detected, the master device 100 may determine a music material matching the action according to the association relationship. Referring to Table 1, Table 1 exemplarily shows the association relationship between the device action and the music material.

TABLE 1

| Electronic device | Device action | Music material | Device action | Music material |
|---|---|---|---|---|
| Master device 100 | Move leftward | Bass drum sound | Move leftward | Rain sound |
| Master device 100 | Move rightward | Miaow | Move rightward | Ocean wave sound |
| Master device 100 | Move upward | Flute sound | Turn upward | Bark |
| Master device 100 | Move downward | Ocean wave sound | Turn downward | Cello sound |
| Secondary device 200 | Move leftward | Maracas sound | Move leftward | Waterfall sound |
| Secondary device 200 | Move rightward | Rain sound | Move rightward | Cello sound |
| Secondary device 200 | Move upward | No effect | Turn upward | Croak |
| . . . | . . . | . . . | . . . | . . . |

For example, when the master device 100 detects that the master device 100 moves upward, in response to the upward action, the master device 100 may determine that a music material associated with the upward action of the master device 100 is a flute sound. Then, the master device 100 may add a music material (a flute sound) corresponding to the device action (moving upward) to the audio being played, so that the audio file being played is further accompanied by an effect of the music material (the flute sound), so as to increase fun of the audio playing process and meet a requirement of the user interacting with the audio being played.

"No effect" may indicate that no music material is matched. For example, when the master device 100 detects that the secondary device 200 moves upward, the master device 100 may not add any interactive music material to the audio being played.

It may be understood that if the system 10 further includes other electronic devices, the device action and music material recorded in Table 1 will correspondingly increase, which will not be listed one by one in this embodiment of this application. Certainly, the device action and the music material recorded in Table 1 are not necessarily all of the currently detected electronic device. For example, the association relationship between the device action and the music material recorded in Table 1 includes the master device 100 and the secondary device 200, but the actual detected object may only include the master device 100 (or the secondary device 200).

Optionally, device actions formed by combining individual actions of a plurality of detected electronic devices may also be record in Table 1. For example, the master device 100 moving leftward+the secondary device 200 moving rightward, or the like. A type of actions is not limited in this embodiment of this application.

In addition, the device actions listed in Table 1 are also optional. When the device action detected by the master device 100 only includes a displacement action, only the association relationship between the displacement action and the music material may be recorded in Table 1; and when the device action detected by the master device 100 only includes the rotation action, only the association relationship between the rotation action and the music material may be recorded in Table 1.

Table 1 exemplarily shows that the association relationship between the device action and the music material is preset. The user may set a music material matching the device action through a user interface provided by the master device 100. In subsequent embodiments, the user interface will be introduced in detail, which will not be expanded herein.

In another embodiment, the system 10 may further include a secondary device 300 (a second scenario). The secondary device 300 includes: a smart wearable device (such as a smart watch, a smart bracelet, or the like), and a game handheld device (such as a game controller, or the like).

The master device 100 may record a music material matching a device action of the secondary device 300. After detecting a specific device action performed by the secondary device 300, the master device 100 may determine the music material matching the action, and then add the music material to the audio being played by the master device 100.

In this way, in a process of playing the audio (especially music), an action of the user waving along with the music may be captured by the secondary device 300. Further, the master device 100 may add more interactive music materials to the audio file being played according to the device action of the secondary device 300.

In a second scenario, the combined action described above may further include an action of the secondary device 300, such as the secondary device 200 turning upward+the secondary device 300 moving downward, or the like.

In the foregoing embodiment, a smart wearable device such as a smart watch or a smart bracelet may be served as the secondary device 300. In another embodiment, a smart wearable device such as a smart watch or a smart bracelet may also be served as the master device 100. The scenario is, for example: playing music on a smart watch, playing music on a smart watch connected to a wireless headset, or the like. This is not limited in this embodiment of this application.

Figure 2:
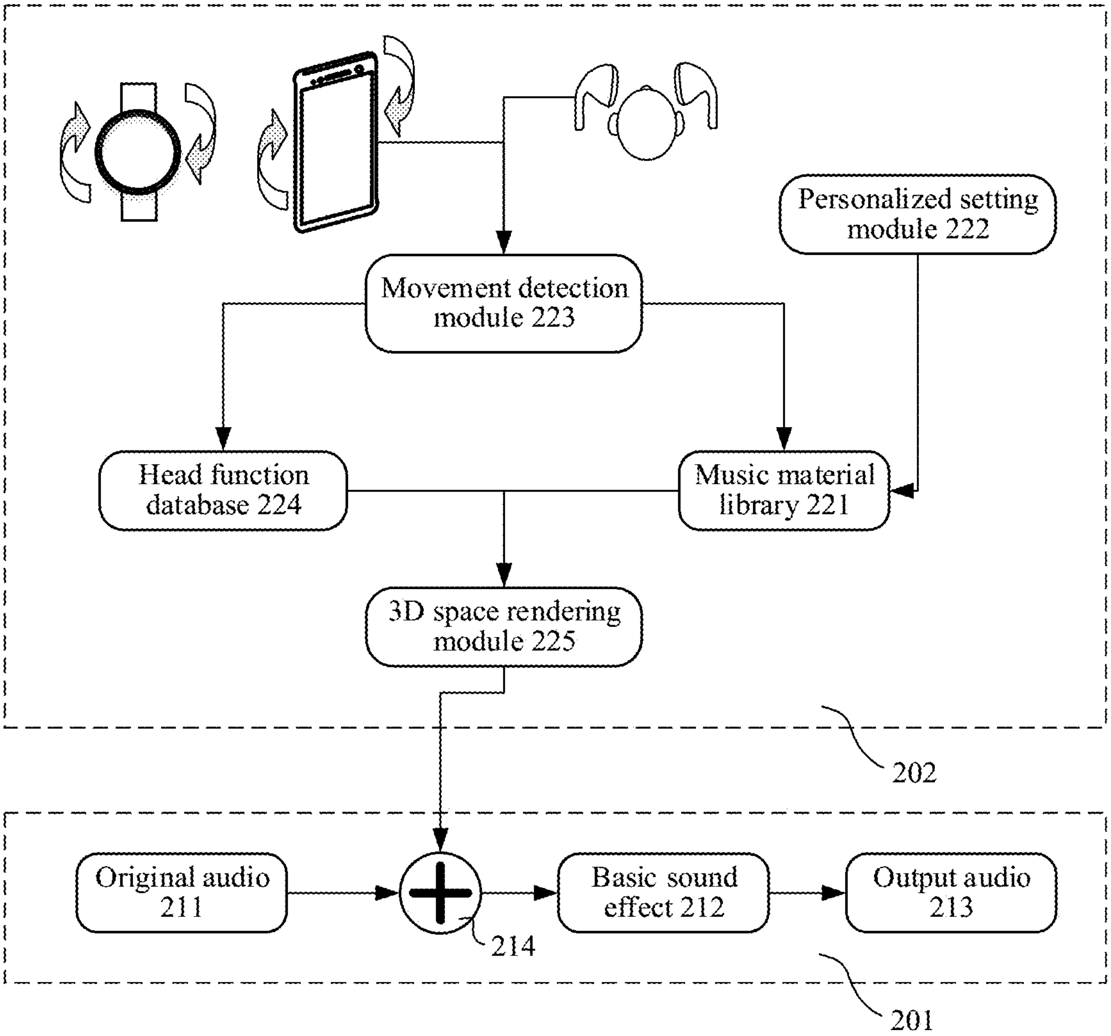
FIG. 2 is a software structural diagram of a sound processing method according to an embodiment of this application.

FIG. 2 exemplarily shows a software structure 20 for implementing a sound processing method according to an embodiment of this application. The software structure for implementing the method will be specifically introduced below with reference to FIG. 2.

As shown in FIG. 2, the software structure 20 includes two parts: an audio playing module 201 and an interactive sound effect processing module 202.

The audio playing module 201 includes: original audio 211, a basic sound effect 212, an output audio 213, and a superposition module 214. The interactive sound effect processing module 202 may include: a music material library 221, a personalized setting module 222, a movement detection module 223, a head function database 224, and a 3D space rendering module 225.

The original audio 211 may be used for indicating the audio being played by the master device 100. For example, in response to a user operation of playing music, the master device 100 plays a specific song (a song A). In this case, audio data of the song A may be referred to as the audio being played by the master device 100.

The basic sound effect 212 may be used for adding some basic playback effects to the original audio 211. The basic sound effect 212 may modify the original audio 211, so that the user finally hears audio with higher quality. The added basic playback effect includes: equalization (adjusting a timbre of music), dynamic range control (adjusting a loudness of music), limiting (preventing an algorithm from clipping), and low-frequency enhancement (enhancing an effect of low frequencies), or the like.

The output audio 213 may be used for indicating the audio being actually played by the secondary device 200. Content and effects included in the output audio 213 are what the user may directly hear or feel. For example, after 3D space rendering is performed on the output audio 213, a sound heard by the user may have a space three-dimensional surround effect.

In this embodiment of this application, the audio playing module 201 further includes a superposition module 214. The superposition module 214 may be configured to add an entertaining interactive effect to the original audio 211. Specifically, the superposition module 214 may receive a music material sent by the interactive sound effect processing module 202, and fuse the music material with the original audio 211, so that a fused audio being played includes the content of the original audio 211, and further includes the content of the music material, to cause the original audio 211 to have an added entertaining interactive effect.

Before the superposition module 214 receives the music material sent by the interactive sound effect processing module 202, the interactive sound effect processing module 202 needs to determine specific content of the interactive effect, that is, determine which music materials to be added to the original audio 211. In addition, the interactive sound effect processing module 202 further needs to perform 3D space rendering on the selected music material, so that the music material has the space three-dimensional surround effect, thereby improving a user experience.

A plurality of music materials are stored in the music material library 221, including an instrument sound, an animal sound, an ambient sound, and a user-defined recording file introduced in the foregoing embodiments. The music material added to the original audio 211 comes from the music material library 221.

All the music materials included in the music material library 221 may be stored on the master device 100, or may be stored in the server. When the music materials are stored on the master device 100, the master device 100 may directly obtain the music material from a local memory when using the music material. When the music materials are stored on the server, the master device 100 may download the required music material from the server to the local memory, and then read the music material from the local memory. The server refers to a device in which a large quantity of music materials are stored and provides a service for a terminal device to obtain the music materials.

The required music material refers to a music material associated with the device action of the detected electronic device. With reference to Table 1, the detected object only includes the master device 100, and the music materials that need to be stored in the memory of the master device 100 include: a bass drum sound, turning leftward, miaow, an ocean wave sound, a flute sound, bark, an ocean wave sound, and a cello sound. The master device 100 does not need to download materials other than the music materials from cloud to the local in advance, thereby saving a storage space of the master device 100.

The personalized setting module 222 may be configured to set the association relationship between the device action and the music material. The user may match any device action with any music material through the personalized setting module 222. For example, the user may match an action of the master device 100 moving leftward with the bass drum sound through the personalized setting module 222.

After being preset by the personalized setting module 222, the master device 100 may obtain a storage table recording the association relationship, and reference may be made to Table 1. Based on the storage table, the master device 100 may determine a music material corresponding to any device action at any time.

The movement detection module 223 may be configured to detect whether electronic devices such as the master device 100, the secondary device 200, and the secondary device 300 perform actions recorded in the storage table. Specifically, an acceleration sensor and a gyroscope sensor may be mounted in the electronic device. The acceleration sensor may be configured to detect whether the electronic device has a displacement action; and the gyroscope sensor may be configured to detect whether the electronic device has a rotation action.

When the master device 100 (or the secondary device 200) performs a displacement action, data of three axes of the acceleration sensor changes. The three axes refer to an X axis, a Y axis, and a Z axis in a space rectangular coordinate system. According to changes in the data of the three axes, the master device 100 may determine whether displacement occurs in the master device 100 (or the secondary device 200). Similarly, according to changes in data collected by the gyroscope sensor, the master device 100 may determine whether rotation occurs in the master device 100 (or the secondary device 200). For specific operating principles of the acceleration sensor and the gyroscope sensor, reference may be made to the subsequent introduction, which will not be expanded herein.

While detecting whether the electronic device performs a specific device action, the movement detection module 223 may further detect a change of an azimuth angle of the master device 100. The azimuth angle refers to the azimuth angle of the master device 100 relative to a head of the user. The movement detection module 223 may set a position of the master device 100 when starting to play audio as a default value, for example, the azimuth angle is 0° (that is, the master device 100 is directly in front of the user by default). Then, the master device 100 may calculate a new azimuth angle according to a change between a moved position and a position at a previous moment. For a specific calculation manner, reference may be made to introduction of subsequent embodiments, which will not be expanded herein.

After the movement detection module 223 detects a specific device action, the master device 100 may query a storage table in the personalized setting module 222 to determine a music material matching the device action. After determining the music material, the master device 100 may obtain audio data of the music material from the music material library 221. In addition, according to a new azimuth angle calculated by the movement detection module 223, the master device 100 may determine a filter coefficient corresponding to the azimuth angle by querying a head function database 224. The filter coefficient refers to parameters of audio outputted by the left ear and the right ear determined by the master device 100 by using the head function filter.

For example, after the movement detection module 223 detects that the master device 100 performs an action of moving leftward, through the storage table shown in Table 1, the master device 100 may determine that the music material matching the action of moving leftward is a bass drum sound. In addition, due to the action of moving leftward performed by the master device 100, the azimuth angle of the master device 100 relative to the user changes from a previous azimuth angle (assumed that the previous azimuth angle is an initial default value of 0°) to 280° (that is, 80° to the left of the front).

Then, the 3D space rendering module 225 may perform space rendering on the selected music material by using a head function filter with the specific filter coefficient, so that the selected music material has a three-dimensional surround effect. In this way, the music material added to the original audio 211 also has the three-dimensional surround effect.

According to a change of a detected object in a system 10, a detection object of the movement detection module 223 in a software structure 20 may be accordingly changed. For example, when the system 10 does not include a secondary device 300, the detection object of the movement detection module 223 does not include the secondary device 300. If the system 10 includes the master device 100 and the secondary device 200, but the detected object only includes the secondary device 200, in this case, the detection object of the movement detection module 223 only includes the secondary device 200.

A flowchart of a sound processing method provided in this embodiment of this application will be specifically introduced below with reference to FIG. 3.

S101. A master device 100 records an association relationship between an action and a music material.

Figure 3:
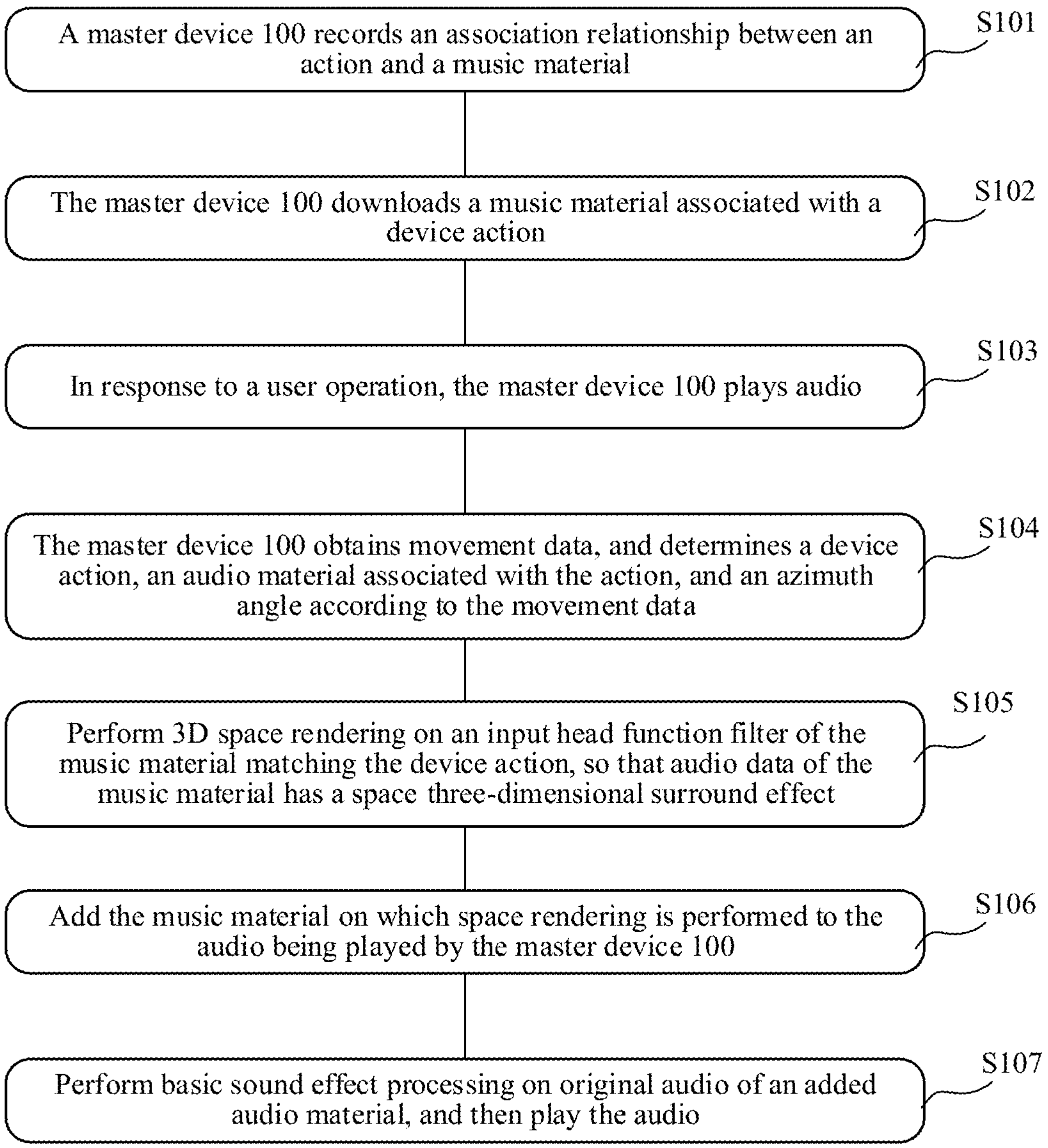
FIG. 3 is a flowchart of a sound processing method according to an embodiment of this application.

As shown in FIG. 3, first, the master device 100 needs to determine the association relationship between the device action and the music material, that is, determine what kind of device action corresponds to what kind of music material. Based on the association relationship, after detecting a specific device action, the master device 100 may determine the music material corresponding to the action.

Specifically, when the master device 100 determines the association relationship between the action and the music material, the master device 100 may display a first user interface. The detected electronic device, an action type (device action) of the detected electronic device, and a preset button for the user to select the music material are displayed on the interface. The master device 100 may display music materials recorded in the preset music material library 221 in response to a user operation acting on the button.

The detected electronic device includes: the master device 100, and/or the secondary device 200, and/or the secondary device 300. Certainly, the user may also delete the detected electronic device supported by the master device 100. For example, after the master device 100 detects the secondary device 300, the master device 100 may display the secondary device 300 on the first user interface. In this case, if the user confirms that a user operation of the secondary device 300 does not need to be detected, the user may delete the secondary device 300. In response to the deletion operation, the master device 100 may not display the secondary device 300.

The detected action types of the electronic device are preset device actions, including a displacement action and a rotation action. The displacement action may include moving leftward, moving rightward, moving upward, and moving downward. Similarly, the rotation action may include turning leftward, turning rightward, turning upward, and turning downward. It may be understood that without being limited to the displacement action and the rotation action, the preset device action may further be another action, which is not limited to this embodiment of this application.

A plurality of music materials that may be selected by the user refer to preset audio with specific content, including an instrument sound, an animal sound, an ambient sound, a user-defined recording file, or the like, which will not be repeated herein.

After the first user interface is displayed, the user may set which action of which electronic device matches which music material. In response to the user operation, the master device 100 may record the association relationship between the action and the music material.

With reference to FIG. 2, specifically, the master device 100 may include a music material library 221 and a personalized setting module 222. A plurality of pieces of audio data of different types that may be selected are stored in the music material library 221, that is, music materials. A preset device action may be recorded by the personalized setting module 222. First, the personalized setting module 222 may match the device action with a default music material. The default music material includes "no effect", and a random music material.

In response to a user operation of setting an association relationship acting on the first user interface, the personalized setting module 222 may modify the originally recorded music material matching a specific device action to a new user-specified music material. Referring to Table 1, a music material that is originally recorded by the personalized setting module 222 and that matches the master device 100 moving leftward is a rain sound. After the user modifies the rain sound into a bass drum sound, the music material that is recorded by the personalized setting module 222 and that matches the master device 100 moving leftward may be changed to the bass drum sound.

In this way, when a specific device action is detected, a record in the personalized setting module 222 is queried, and the master device 100 may confirm the music material matching the action.

S102. The master device 100 downloads the music material associated with the device action.

After the user sets the music material matching the device action, the master device 100 may first determine whether the music material has been stored in a local memory. The local memory refers to a memory of the master device 100.

If the music material has been stored in the local memory, when the music material needs to be invoked, the master device 100 may directly obtain the music material from the memory. If the music material has not been stored in the local memory, the master device 100 needs to obtain the music material from the server providing the music material, and store the music material in the local memory, so as to be invoked at any time.

In this way, the music material library 221 may include a large quantity of music materials, and the master device 100 may obtain some music materials according to actual needs, thereby reducing a demand on a storage capability of the master device 100. Further, the master device 100 may also download the required music material each time when implementing the sound processing method provided in this embodiment of this application, and delete the downloaded music material when the downloaded music material is not required.

S102 is optional. If the music materials recorded in the music material library 221 only include the music materials stored in the master device 100, then the master device 100 does not need to download the music material from the server. Conversely, if the music materials recorded in the music material library 221 are provided by the server, the local memory of the master device 100 may only include some of the music materials recorded in the music material library 221. In this case, the master device 100 needs to determine whether the music material specified by the user and matching the device action may be obtained from the local memory. If not, then the master device 100 needs to download the music materials that are not downloaded to the local memory to the local memory in advance.

For example, after it is recorded in Table 1 that the music material matching the master device 100 moving leftward is a bass drum sound, if the master device 100 determines that audio data of the bass drum sound has not been stored in the local memory, the master device 100 needs to download the audio data of the bass drum sound from a server providing the bass drum sound. In this way, when the master device 100 detects that the master device 100 performs an action of moving leftward, the master device 100 may directly obtain the audio data of the bass drum sound from the local memory.

S103. In response to the user operation, the master device 100 plays audio.

The master device 100 may detect an operation of playing audio performed by the user, and in response to the playing operation, the master device 100 may start to play original audio. The operation of playing the audio may be an operation acting on audio software of third-party software, or may be an operation acting on audio software included in a system of the master device 100.

Specifically, when the sound processing method provided in this embodiment of this application is applied as a system, the audio software included in the system of the master device 100 or the audio software of the third-party software may add an entertaining interactive sound effect to the audio being played by using the system application. Certainly, the method may also be a function plug-in provided by the third-party audio software. In this way, when using the third-party audio software and enabling the plug-in, the master device 100 may add the entertaining interactive sound effect to the audio being played.

The master device 100 may divide audio data being played according to a preset length. In this way, the audio data being played may be divided into several data segments. The data segment being played may be referred to as a first data segment. After the first data segment, a to-be-played data segment may be referred to as a second data segment.

When the master device 100 plays the first data segment, the master device 100 may detect a specific device action. After determining the music material corresponding to the device action and performing processing on the material, the master device 100 may fuse audio data (added audio data) of the processed music material with the second data segment, so that the second data segment not only includes content of the original audio, but also includes content of the added music material. It may be understood that a data length of the added audio data is consistent with a data length of the second data segment.

S104. The master device 100 obtains movement data, and determines a device action, an audio material associated with the action, and an azimuth angle according to the movement data.

After starting to play the original audio, the master device 100 may start to obtain the movement data of the detected electronic device. The movement data includes data collected by an acceleration sensor (acceleration data) and data collected by a gyroscope sensor (gyroscope data). The movement data may indicate whether the detected electronic device performs an action matching a preset action.

An example in which the detected devices include: the master device 100 and the secondary device 200 is used. the master device 100 may receive acceleration data and gyroscope data of the master device 100. In addition, the master device 100 may further receive acceleration data and gyroscope data from the secondary device 200. The acceleration data and the gyroscope data of the secondary device 200 may be sent to the master device 100 through a wired or wireless connection between the master device 100 and the secondary device 200. It may be understood that when the detected electronic devices increase or decrease, the movement data that the master device 100 needs to obtain accordingly increases or decreases.

After obtaining acceleration data and gyroscope data of the electronic device, the master device 100 may calculate the device action indicated by the movement data.

Figure 4C:
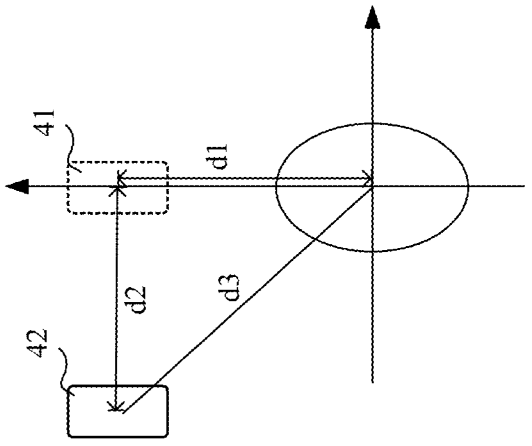
FIG. 4C is a schematic diagram of a master device recognizing an azimuth angle according to an embodiment of this application.
Figure 4B:
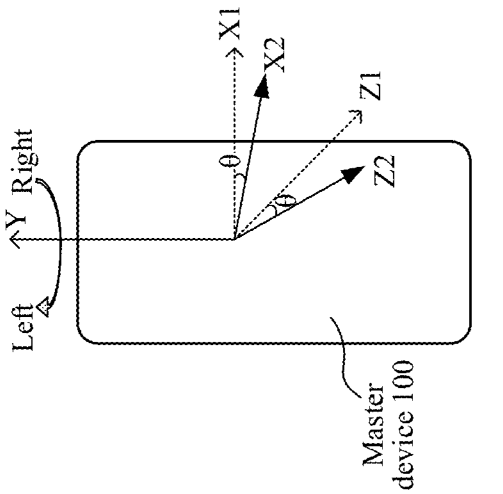
FIG. 4B is a schematic diagram of another master device recognizing a device action according to an embodiment of this application.
Figure 4A:
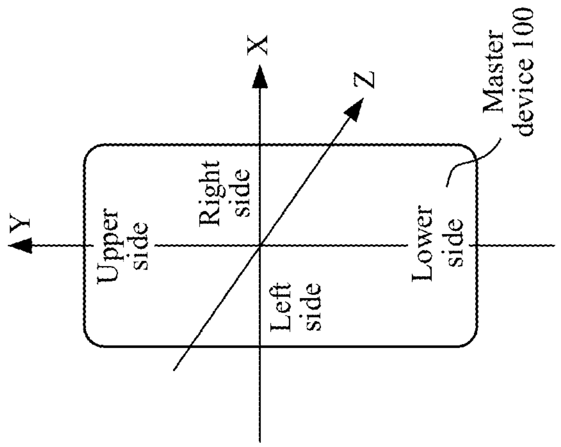
FIG. 4A is a schematic diagram of a master device recognizing a device action according to an embodiment of this application.

FIG. 4A is a schematic diagram of a master device 100 determining a device action according to acceleration data. As shown in FIG. 4A, the acceleration sensor may establish a space rectangular coordinate system with a center point of the master device 100 as an origin. A positive direction of an X axis of the coordinate system is horizontally rightward; a positive direction of a Y axis of the coordinate system is vertically upward; and a positive direction of a Z axis of the coordinate system is forward facing the user. Therefore, the acceleration data specifically includes: X-axis acceleration, Y-axis acceleration, and Z-axis acceleration.

A value of the X-axis acceleration is close to the gravitational acceleration g value (9.81), which may indicate that a left side of the master device 100 faces downward. Conversely, a value of the X-axis acceleration is close to a negative g value, which may indicate that a right side of the master device 100 faces downward. Similarly, if a value of the Y-axis acceleration is close to the g value, it may indicate that a lower side of the master device 100 faces downward; a value of the Y-axis acceleration is close to a negative g value, which may indicate that an upper side of the master device 100 faces downward (inverted); a value of the Z-axis acceleration is close to the g value, which may indicate that a screen of the master device 100 faces upward, that is, the positive direction of the Z axis in this case is consistent with the positive direction of the Y axis in the figure; and a value of the Z-axis acceleration is close to the negative g value, which may indicate that a screen of the master device 100 faces downward, that is, the positive direction of the Z axis in this case is consistent with a negative direction of the Y axis in the figure.

Based on a determined device orientation, the master device 100 may further determine a device action. Specifically, using the device orientation shown in FIG. 4A as an example (the Y axis facing upward and the X axis facing rightward), if the value of the X-axis acceleration is positive, the master device 100 may confirm that the master device 100 performs an action of moving rightward; if the value of the X-axis acceleration is negative, the master device 100 may confirm that the master device 100 performs an action of moving leftward; if the value of the Y-axis acceleration is equal to A+g, the master device 100 is moving upward with acceleration of A $m/s^2$; and if the value of the Y-axis acceleration is equal to −A+g, the master device 100 is moving downward with acceleration of −A $m/s^2$.

In this way, when data collected by the acceleration sensor meets the preset condition, the master device 100 may determine that the master device 100 performs a device action (displacement action) corresponding to the preset condition. Further, the master device 100 may determine a music material matching the displacement action.

FIG. 4B is a schematic diagram of a master device 100 determining a device action according to gyroscope data. As shown in FIG. 4B, the gyroscope sensor may also establish a space rectangular coordinate system with a center point of the master device 100 as an origin. Reference may be made to the introduction in FIG. 4A, and details will not be repeated herein. The gyroscope data specifically includes: X-axis angular velocity, Y-axis angular velocity, and Z-axis angular velocity.

When the master device 100 moves, the master device 100 may further simultaneously rotate. When rotating, the space rectangular coordinate system established by the gyroscope sensor with the center point of the master device 100 as the origin also changes. According to the change, the master device 100 may determine that the master device 100 performs a rotation action.

For example, the master device 100 may rotate from right to left with the Y axis as a rotation center. The action may correspond to turning leftward in Table 1. In a unit time, in a process of turning leftward, the positive direction of the X axis and the positive direction of the Z axis in the space rectangular coordinate system change. Specifically, referring to FIG. 4C, before turning leftward, the positive direction of the X axis may be represented as a direction pointed by X1; and the positive direction of the Z axis may be represented as a direction pointed by Z1. After turning leftward, the positive direction of the X axis may be represented as a direction pointed by X2; and the positive direction of the Z axis may be represented as a direction pointed by Z2. In this case, a rotation angle between X1 and X2 is denoted as 0 (angular velocity: 0/s); a rotation angle between Z1 and Z2 is also 0 (angular velocity: 0/s); and a rotation angle of the Y axis is 0 (angular velocity:

In this way, when data collected by the gyroscope sensor meets the preset condition, the master device 100 may determine that the master device 100 performs a device action (rotation action) corresponding to the preset condition. Further, the master device 100 may determine a music material matching the rotation action.

For the method for the master device 100 to determine whether the secondary device 200 performs a preset device action, reference may be made to the foregoing introduction, and details will not be repeated herein.

While detecting the device action of the electronic device, the master device 100 further needs to determine an azimuth angle of the master device 100 relative to the user. Specifically, the master device 100 may determine an azimuth angle of the master device 100 after performing a specific device movement according to two position changes.

An example in which the master device 100 performs an action of moving leftward is used. FIG. 4C is a schematic diagram of a master device 100 determining an azimuth angle of the master device 100 after moving leftward. As shown in FIG. 4C, an icon 41 shows a position of the master device 100 before moving leftward. An icon 42 shows a position of the master device 100 after moving leftward.

First, the master device 100 may set an initial orientation ($\theta_0$) to 0° and a distance to d1, that is, by default, the master device 100 is directly in front of the user (a position indicated by the icon 41). The distance refers to a distance between a center point of the device and a midpoint of a connecting line between ears of a listener. This is because when the user completes the operation of playing the audio, the user usually places a mobile phone directly in front of the user, and a distance is usually within 50 cm (a length of the arms), so that the user may face a screen and complete a playing operation acting on the mobile phone screen.

The master device 100 may move from the position shown by the icon 41 to the position shown by the icon 42 by moving leftward. In this case, the master device 100 may determine a distance by which the master device 100 moves leftward, which is denoted as d2. In this case, a new azimuth angle θ1 of the master device 100 relative to the user may be determined by the d1 and d2. In addition, the master device 100 may further determine a distance d3 from the user in this case.

By analogy, the master device 100 may determine a position after the movement according to a distance and a direction of the movement and a position at a previous moment, so as to determine an azimuth angle to the user. Based on the azimuth angle, the master device 100 may determine a filter coefficient used by a head function filter.

In another embodiment, the master device 100 may further directly detect a distance between the master device 100 and the user through a depth-sensing camera.

S105. Perform 3D space rendering on an input head function filter of the music material matching the device action, so that audio data of the music material has a space three-dimensional surround effect.

The head function filter refers to an apparatus that performs processing on the audio data by using a head related transform function (HRTF). The head function filter may simulate propagation of a sound signal in a three-dimensional space, so that the sound heard by ears of the user is different, and the sound has a space three-dimensional surround effect.

Referring to S104, after determining that the electronic device performs a specific device action according to the movement data of the electronic device, the master device 100 may determine the music material matching the device action through a correspondence recorded in the personalized setting module 222. After obtaining the music material, the master device 100 may first perform 3D space rendering on the audio data of the music material by using the head function filter, and then superimpose the processed audio data on the original audio, so that audio heard by the user is accompanied by an interactive sound effect, and the interactive sound effect has a space three-dimensional surround effect.

Figure 5A:
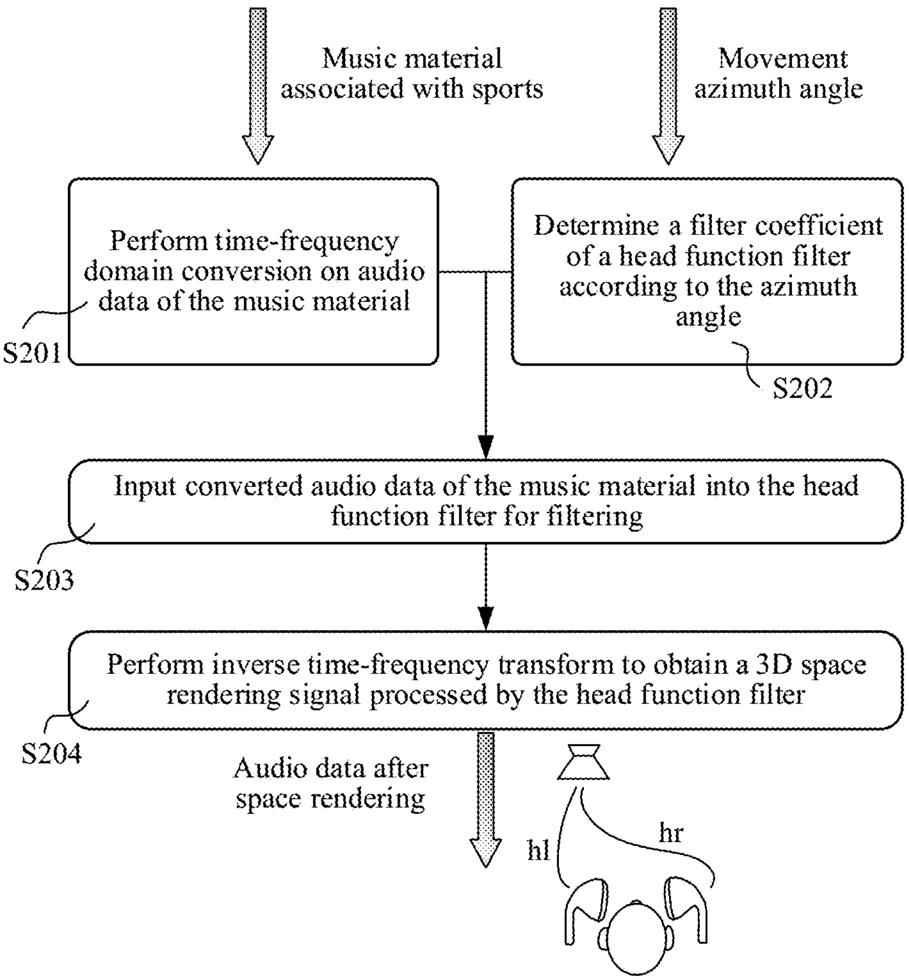
FIG. 5A is a flowchart of a master device performing 3D space rendering on audio according to an embodiment of this application.

Specifically, a process in which the head function filter performs 3D space rendering on the audio data of the music material may be shown in FIG. 5A.

S201. Perform time-frequency domain conversion on the audio data of the music material.

First, the master device 100 may perform time domain conversion or frequency domain conversion on the audio data of the music material to obtain time domain audio data or frequency domain audio data.

S202. Determine a filter coefficient of the head function filter according to an azimuth angle.

Before performing 3D space rendering on the audio data of the selected music material by using the head function filter, the master device 100 further needs to determine the filter coefficient of the head function filter. The filter coefficient may affect a rendering effect of 3D space rendering. If the filter coefficient is inappropriate or even wrong, there is a significant difference between a sound processed by the head function filter and a sound actually transmitted to the ears of the user, thereby affecting a listening experience of the user.

The filter coefficient may be determined by an azimuth angle. Specifically, a mapping relationship between the azimuth angle and filter data is recorded in a head related transform function (HRTF) database. After determining the azimuth angle, the master device 100 may determine the filter coefficient of the head function filter by querying the HRTF database. According to a distinction between a time domain and a frequency domain, filter coefficients corresponding to the same azimuth angle are also correspondingly divided into a time domain filter coefficient and a frequency domain filter coefficient.

Referring to S201, if it is determined to perform 3D space rendering on the audio data of the music material in the frequency domain, the master device 100 may determine the frequency domain filter coefficient as the filter coefficient of the head function filter. Conversely, if it is determined to perform 3D space rendering on the audio data of the music material in the time domain, the master device 100 may determine the time domain filter coefficient as the filter coefficient of the head function filter.

S203. Input the converted audio data of the music material into the head function filter for filtering.

After obtaining frequency domain (or time domain) audio data and determining the filter coefficient, the master device 100 may input the audio data into a head function filter corresponding to the filter coefficient. Then, the head function filter may multiply the inputted frequency domain (or time domain) audio data by the corresponding filter coefficient to obtain rendered frequency domain (or time domain) audio data. In this case, the rendered frequency domain (or time domain) audio data may have a space three-dimensional surround effect.

S204. Perform inverse time-frequency transform to obtain a 3D space rendering signal processed by the head function filter.

Referring to S201, before inputting the audio data into the head function filter for filtering (S203), the master device 100 performs time-frequency domain conversion on the audio data. Therefore, after the filtering is completed, the master device 100 further needs to perform inverse time-frequency domain transform on the audio data on which time-frequency domain conversion is performed, so that the audio data on which time-frequency domain conversion is performed is restored to a data format that may be processed by an audio player.

If time domain transform is performed in S201, the master device 100 performs conversion on the rendered audio data by using inverse time domain transform; and conversely, if frequency domain transform is performed in S201, the master device 100 performs conversion on the rendered audio data by using inverse frequency domain transform.

Figure 5B:
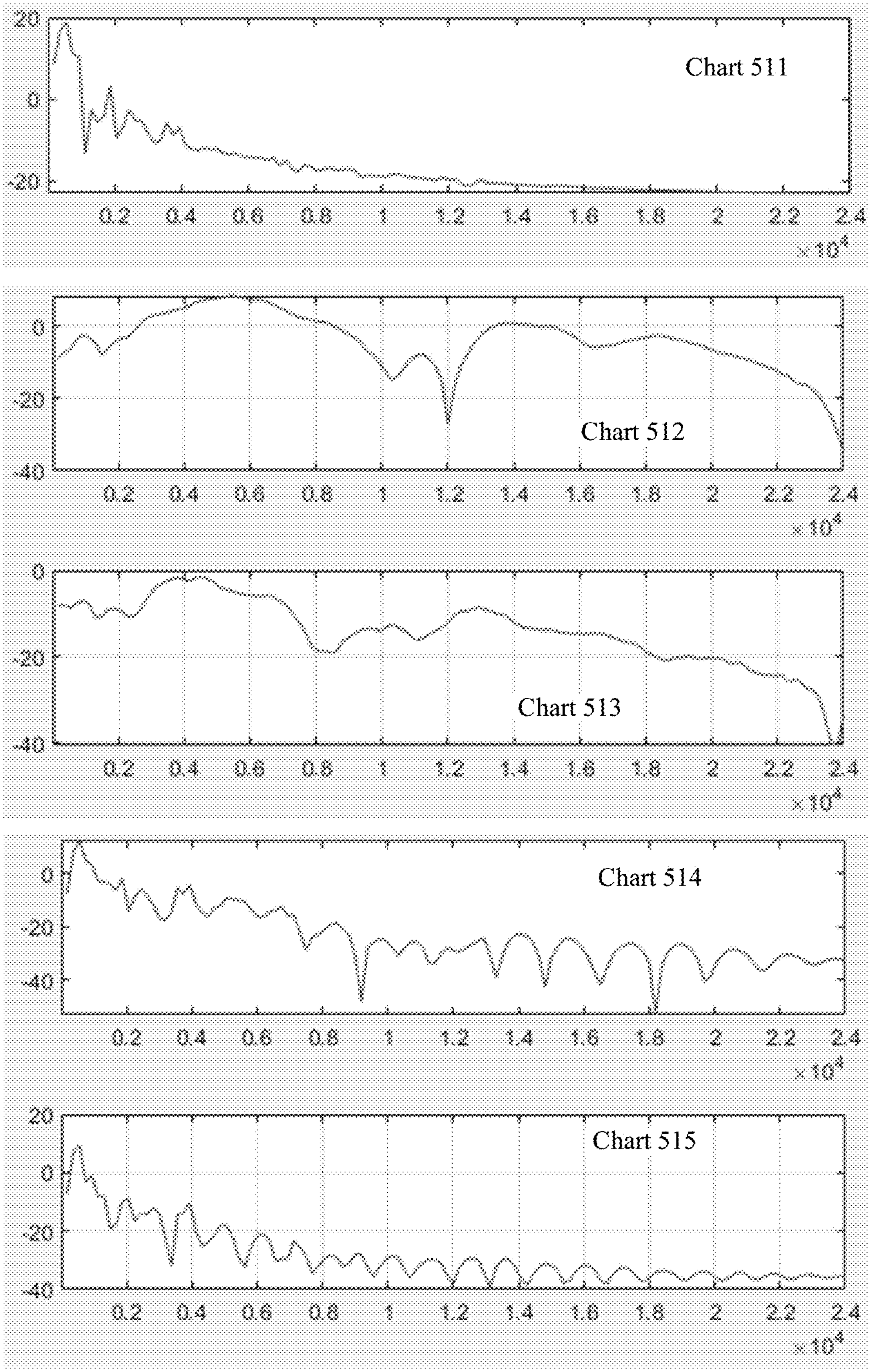
FIG. 5B is a schematic diagram of performing 3D space rendering on a set of pieces of frequency domain audio according to an embodiment of this application.

Using frequency domain 3D space rendering as an example, FIG. 5B exemplarily shows a schematic diagram of performing 3D space rendering on a frequency domain audio signal by a head function filter using a frequency domain filter coefficient.

As shown in FIG. 5B, a chart 511 is a frequency domain signal of a specific audio material. A vertical axis represents a sample point amplitude (dB), and a horizontal axis represents a frequency (Hz). A frequency domain signal in the chart 511 may be used as the audio data of the music material on which frequency domain conversion introduced in S201 is performed. A chart 512 and a chart 513 respectively show frequency domain filter coefficients corresponding to a specific azimuth angle in the head function database. The chart 512 shows a left sound channel frequency domain filter coefficient corresponding to the azimuth angle; and the chart 513 shows a right sound channel frequency domain filter coefficient corresponding to the azimuth angle. A vertical axis represents a head function amplitude (dB), and a horizontal axis represents a frequency (Hz).

By multiplying audio data in the chart 511 and the frequency domain filter coefficients shown in the chart 512 and the chart 513 by a frequency, the master device 100 may respectively obtain a rendered left sound channel frequency domain audio signal and a rendered right sound channel frequency domain audio signal. A chart 514 and a chart 515 respectively show the left sound channel frequency domain audio signal and the right sound channel frequency domain audio signal.

Then, inverse frequency domain conversion is performed, and the master device 100 may obtain a rendered left sound channel audio signal and a rendered right sound channel audio signal. Further, a left ear device of the secondary device 200 may play the left sound channel audio signal; and a right ear device of the secondary device 200 may play the right sound channel audio signal. In this way, added music materials heard by the left ear and the right ear of the user are different and have a space three-dimensional surround effect.

Figure 5C:
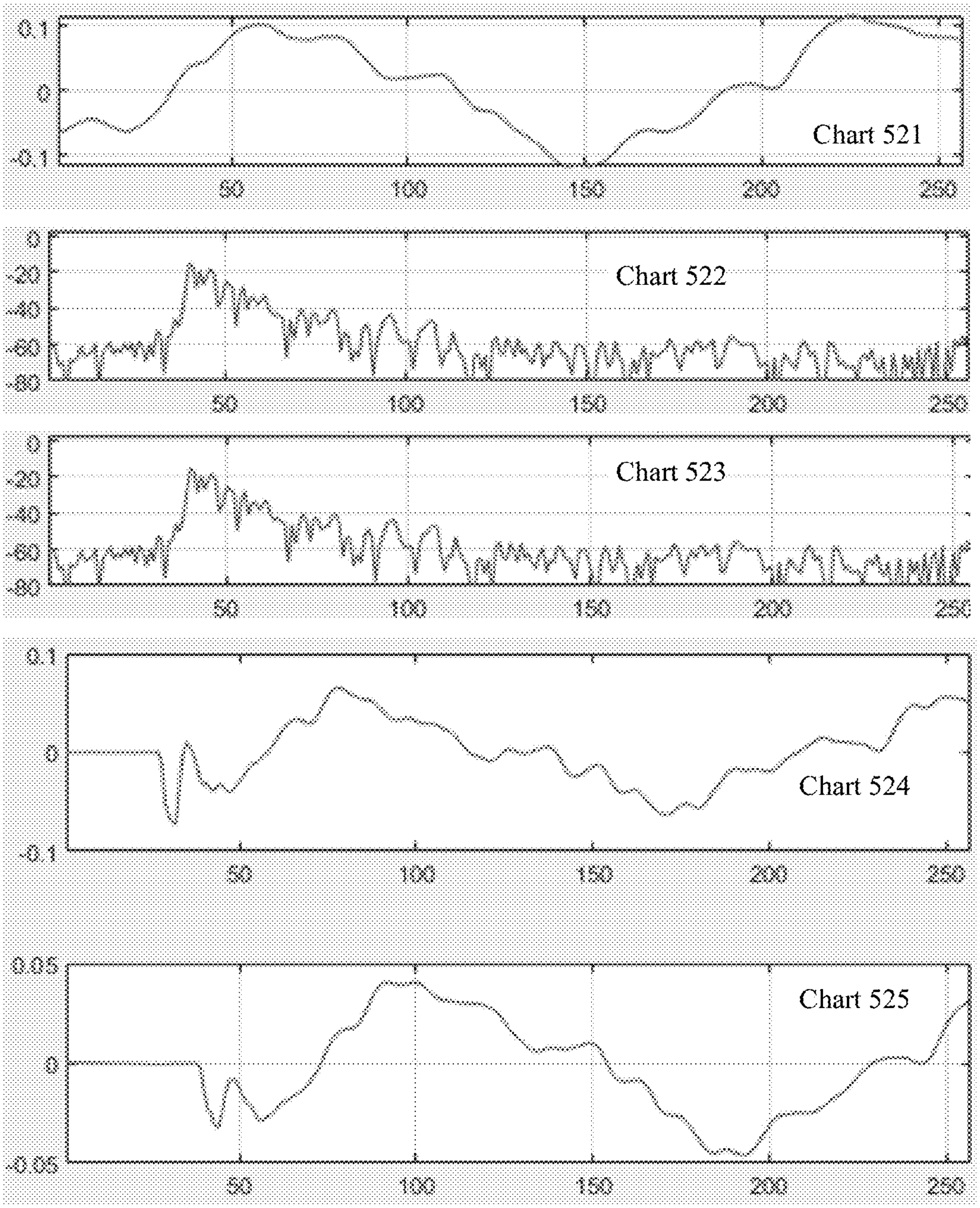
FIG. 5C is a schematic diagram of performing 3D space rendering on a set of pieces of time domain audio according to an embodiment of this application.

The head function filter may also perform 3D space rendering on the time domain audio signal by using the time domain filter coefficient. With reference to FIG. 5C, a chart 521 shows a time domain signal of a specific audio material. A vertical axis represents a sample point amplitude, and a horizontal axis represents a sample point sequence number according to time. A chart 522 and a chart 523 respectively show time domain filter coefficients corresponding to a specific azimuth angle in the head function database. The chart 522 shows a left sound channel time domain filter coefficient corresponding to the azimuth angle; and the chart 523 shows a right sound channel time domain filter coefficient corresponding to the azimuth angle. A vertical axis represents a sample point amplitude, and a horizontal axis represents a sample point sequence number according to time.

After being performed convolution (Convolution) by the time domain filter coefficients (chart 522 and chart 523), the time domain signal (chart 521) may obtain a left sound channel time domain signal (chart 524) and a right sound channel time domain signal (chart 525) on which 3D space rendering is performed.

Calculation complexity of a method based on the time domain is higher than calculation complexity of a method based on the frequency domain when a length of a filter is relatively long. Therefore, in a case that the length of the filter is relatively long, the master device 100 may preferentially adopt the method based on the frequency domain to perform rendering on the frequency domain audio signal, so as to reduce time complexity and save calculation resources.

S106. Add the music material on which space rendering is performed to the audio being played by the master device 100.

After obtaining the music material on which 3D space rendering is performed, the master device 100 may add the music material to the audio being played by the master device 100. In this way, the user may simultaneously hear both the audio being played and the added music material.

Generally, the master device 100 may directly add the music material to the audio being played. If a quantity of pieces of audio that is simultaneously superimposed is too large, it is easy to cause a superimposed signal to be too large, resulting in clipping. Therefore, in a process of adding the music material, the master device 100 may further avoid a case that the superimposed signal is too large by using a method of weighting.

For example, if there are n added music materials, a weight of each audio material may be:

$$W_i=1/n$$

Therefore, audio on which the music material is superimposed is:

$$S_{output}=S_{input}+\Sigma^n{}_l r_i w_i$$

$S_{output}$ is a superimposed output signal, $S_{input}$ is an originally played music signal, $r_i$ is an $i^{th}$ music material, and $w_i$ is a weight of the music material.

In addition, the master device 100 may further set different weights for different electronic devices, but a sum of the weights is 1. For example, when a quantity of detected electronic devices is three, including the master device 100, the secondary device 200, and the secondary device 300, a weight $W_1$ of the secondary device 200 may be 0.3, a weight $W_2$ of the secondary device 300 may be and a weight $W_3$ of the master device 100 may be 0.4.

S107. Perform basic sound effect processing on original audio of the added audio material, and then play the audio.

After the music material is added, the master device 100 may further perform basic sound effect processing on the audio to which the music material is added. The basic sound effect specifically includes: equalization, dynamic range control, limiting, low-frequency enhancement, or the like. Specifically, reference may be made to FIG. 2, and details are not repeated herein again. The audio on which basic sound effect processing is performed has higher quality. Therefore, the user may obtain a better listening experience.

Then, the master device 100 may play the audio. A process of converting an electrical signal into a sound signal is completed by the secondary device 200. In this case, a sound heard by the user from the secondary device 200 includes not only audio originally specified by the user, but also an interactive music material generated according to a device movement.

When the sound processing method shown in FIG. 2 is implemented, the master device 100 may detect a movement state of the electronic device when playing audio such as music. When it is detected that the electronic device performs an action matching a preset action, the master device 100 may add a music material matching the action to the music being played. In this way, the user may add an interactive effect to the music while listening to the music, thereby improving the fun of a music playing process and meeting a requirement of the user interacting with the audio being played.

Further, in a process of adding the music material, the master device 100 further performs 3D space rendering on the added music material according to a position change between the electronic device and the user, so that the added music material heard by the user further has a space three-dimensional surround effect.

FIG. 6A to FIG. 6J show a set of user interfaces according to an embodiment of this application. A schematic diagram of a user interface for implementing a sound processing method according to an embodiment of this application will be introduced below with reference to FIG. 6A to FIG. 6J.

Figure 6A:
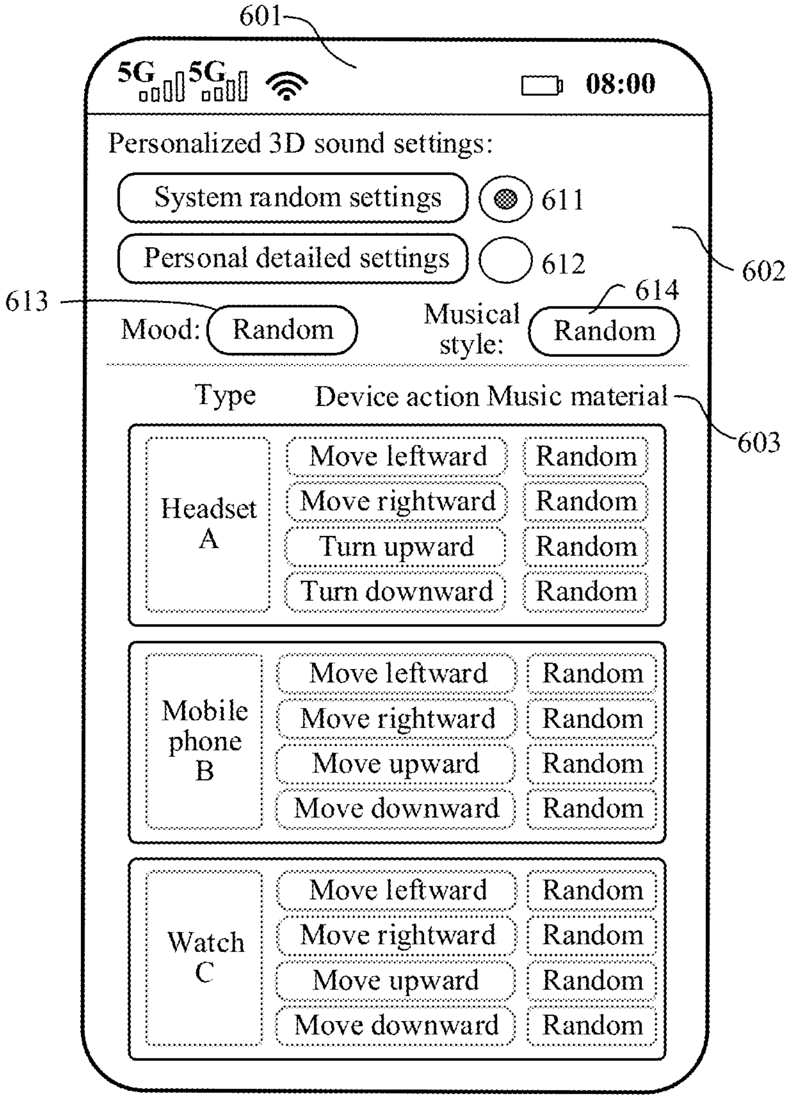
FIG. 6A to FIG. 6J show a set of user interfaces according to an embodiment of this application.

FIG. 6A is a schematic diagram of a master device 100 displaying a first user interface. As shown in FIG. 6A, the first user interface includes a status bar 601, an area 602, and an area 603. The status bar 601 specifically includes: one or more signal strength indicators of a mobile communication signal (also referred to as a cellular signal), one or more signal strength indicators of a wireless fidelity (wireless fidelity, Wi-Fi) signal, a battery status indicator, a time indicator, or the like. The area 602 may be used for displaying some global setting buttons. The area 603 may be used for displaying specific music materials that match each device action.

A "headset A", a "mobile phone B", and a "watch C" displayed in the area 603 are optional. The master device 100 may detect a user operation acting on a specific electronic device, and in response to the operation, the master device 100 may set not to detect a device action of the electronic device. The user operation is, for example, a left-swiping deletion operation, or the like. This is not limited in this embodiment of this application.

A button 611 and a button 612 may be displayed in the area 602. When a user operation acting on the button 611 is detected, in response to the operation, the master device 100 may randomly match the device action with the music material. In this way, the user does not need to set the music material matching each device action one by one. In this case, the music material associated with each device action displayed in the area 603 is "random".

Figure 6B:
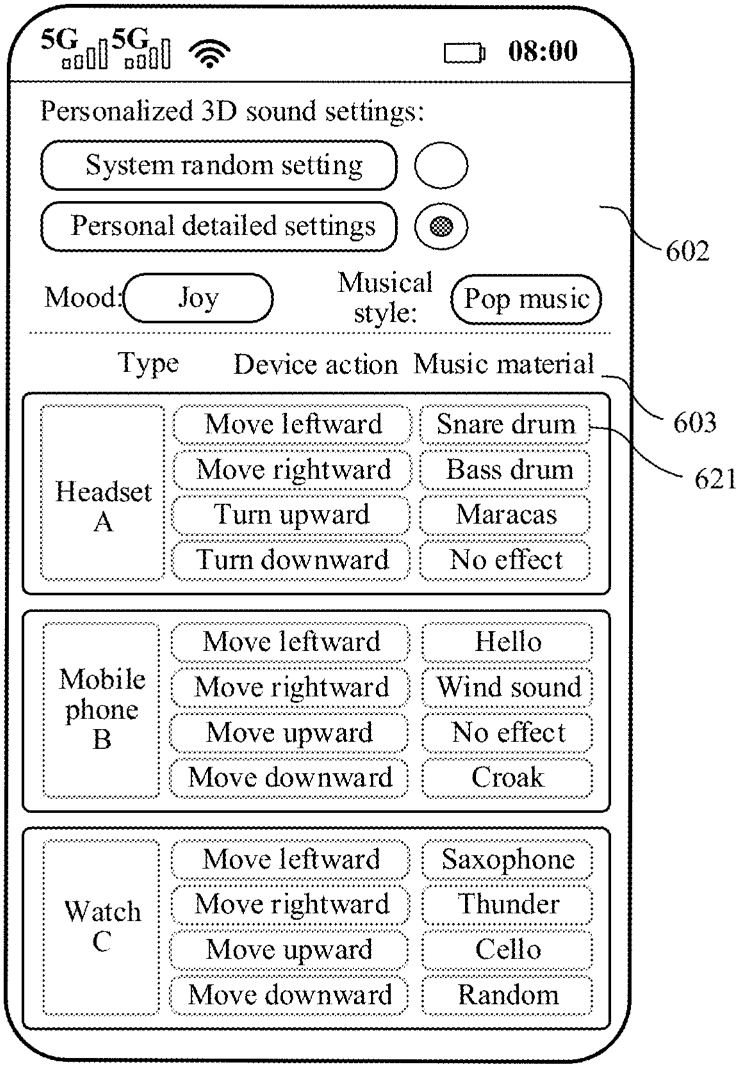

When a user operation acting on the button 612 is detected, in response to the operation, the master device 100 may display the user interface shown in FIG. 6B. In this case, the user may set the music material matching each device action one by one. For example, an action of turning leftward of the "headphone A" shown in the area 603 in FIG. 6B may match a music material of a type of a snare drum sound.

The first user interface shown in FIG. 6A (or FIG. 6B) may further include a button 613 and a button 614. The button 613 may be configured to set mood of the user. According to the mood, the master device 100 may filter the music materials provided in the music material library 221. The master device 100 may not display music materials that obviously do not match current mood of the user. In this way, the user may filter out some unnecessary music materials through the button 613, thereby reducing operation complexity of designating the music material by the user.

For example, the master device 100 may detect a user operation acting on the button 613. In response to the operation, the master device 100 may display the user interface shown in FIG. 6C. In this case, the master device 100 may display a series of mood types that may be selected by the user, including joy, sadness, anger, fear, or the like. When the master device 100 detects a user operation acting on any mood option, the master device 100 may filter all types of music materials provided in the music material library 221 according to the mood type. For example, after the master device 100 detects a user operation acting on a sadness button 631, the master device 100 may filter out music materials matching sad mood provided in the music material library 221 according to the mood type of sadness. Music materials matching the sad mood are, for example, an erhu sound, a rain sound, or the like. The master device 100 may not display music materials that obviously do not match the sad mood, such as a suona sound, birdsong, or the like.

Figure 6C:
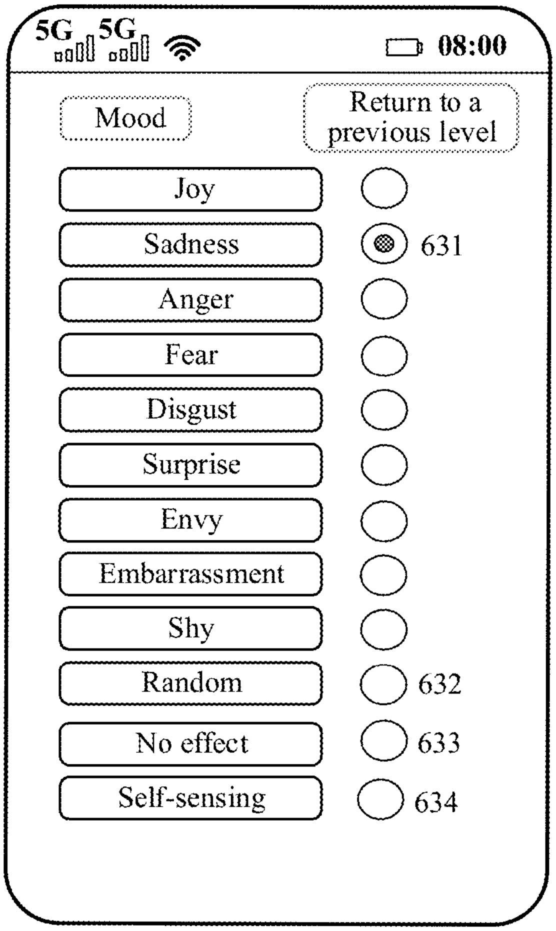

The user interface shown in FIG. 6C further includes a random button 632 and a no effect button 633. When a user operation acting on the random button 632 is detected, in response to the operation, the master device 100 may randomly set the mood type of the user, and then filter music materials matching the mood type according to a mood type that is randomly set. When a user operation acting on the no effect button 633 is detected, the master device 100 may not perform an operation of filtering music materials provided in the music material library 221 from the perspective of the mood type in response to the operation.

In another embodiment, the mood may also be automatically sensed by the master device 100. That is, the master device 100 may determine the current mood of the user by obtaining physiological data of the user. For example, the user interface shown in FIG. 6C may include a self-sensing button 634.

The button 614 may be configured to set a musical style of the added music material as a whole. Similarly, according to the selected music style, the master device 100 may filter the music materials provided in the music material library 221. The master device 100 may not display music materials that obviously do not match a current music style of the user. In this way, the user may filter out some unnecessary music materials through the button 614, thereby reducing operation complexity of designating the music material by the user.

Figure 6D:
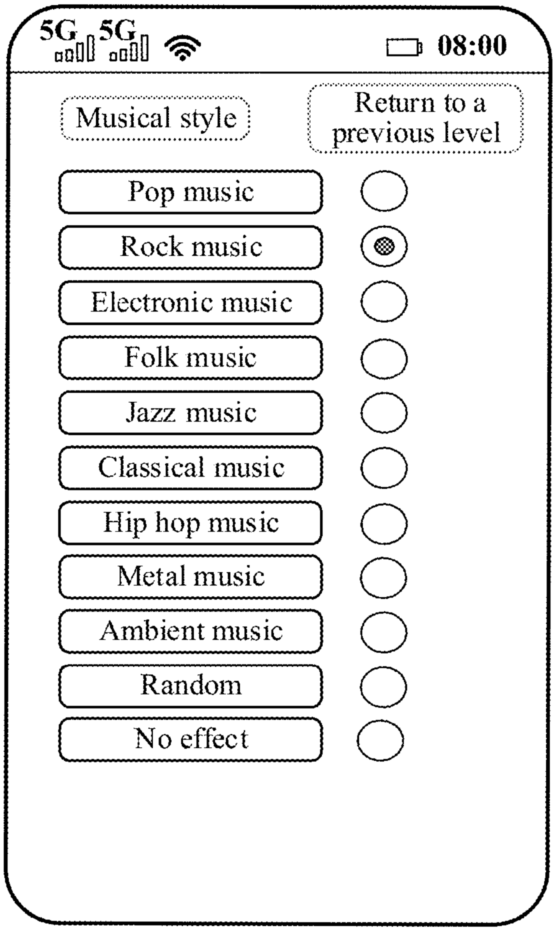

In response to a user operation acting on the button 614, the master device 100 may display the user interface shown in FIG. 6D. In this case, the master device 100 may display a series of music styles that may be selected by the user, including pop music, rock music, electronic music, folk music, classical music, or the like. For example, after the master device 100 detects a user operation acting on a rock music button, the master device 100 may filter out music materials matching a type of rock music provided in the music material library 221. Music materials matching the type of rock music include a guitar sound, a bass sound, a drum kit sound, or the like. The master device 100 may not display music materials that obviously do not match the type of rock music, such as a guzheng sound, a pipa sound, or the like.

For an interface of the master device 100 described above used for displaying the music materials provided in the music material library 221, reference may be made to FIG. 6E to FIG. 6J. In a process in which the master device 100 displays the first user interface, when the master device 100 detects a user operation acting on any music material button, the master device 100 may display a user interface including a plurality of types of music materials.

Figure 6E:
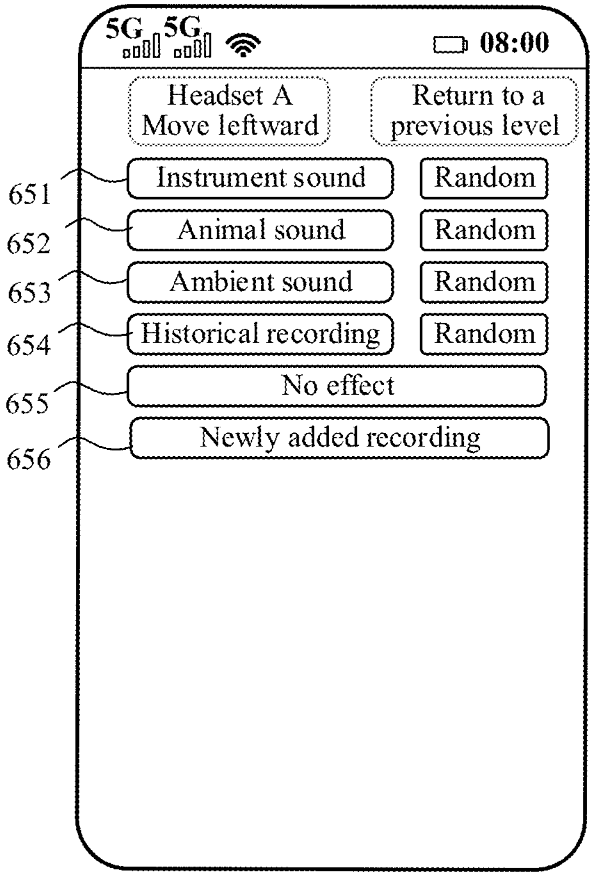

For example, on the user interface shown in FIG. 6B, when the user operation acting on the button 621 is detected, the master device 100 may display the user interface shown in FIG. 6E. A plurality of different types of option buttons, such as a button 651, a button 652, a button 653, and a button 654 may be display on the interface. The button 651 may be configured to display music materials of a type of instrument sounds. The button 652 may be configured to display music materials of a type of animal sounds; the button 653 may be configured to display music materials of a type of ambient sounds; and the button 654 may be configured to display a recording of the user.

Figure 6F:
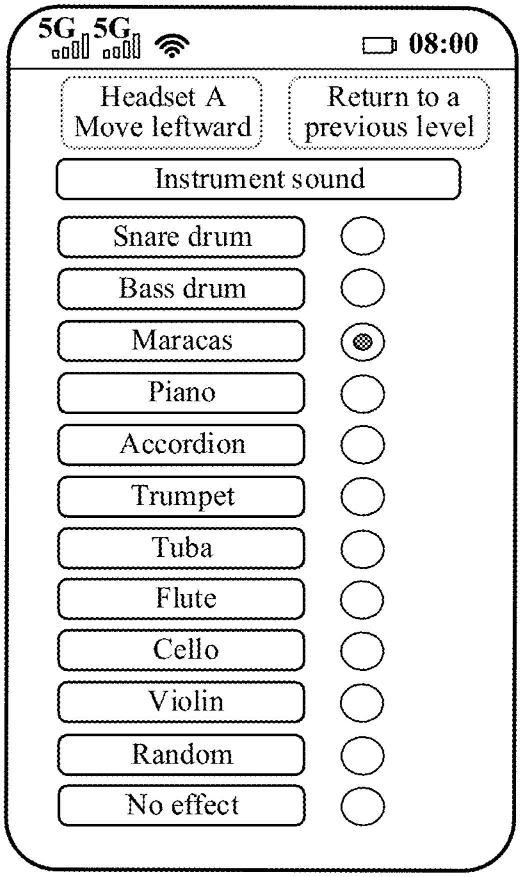

In response to a user operation acting on the button 651, the master device 100 may display the user interface shown in FIG. 6F. A plurality of buttons indicating different types of instruments may be displayed on the user interface, such as a snare drum, a bass drum, a maracas, a piano, an accordion, or the like. The master device 100 may detect a user operation acting on any button. In response to the operation, the master device 100 may match a music material corresponding to the button with a device action (turning leftward) corresponding to the button 621. In this way, when the device action is detected, the master device 100 may add the music material to the audio being played.

Figure 6G:
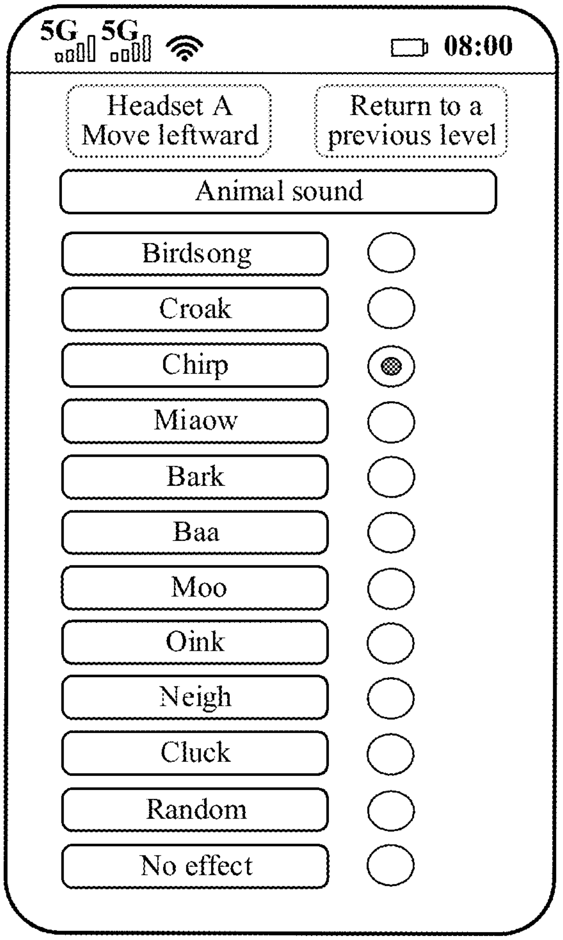
Figure 6H:
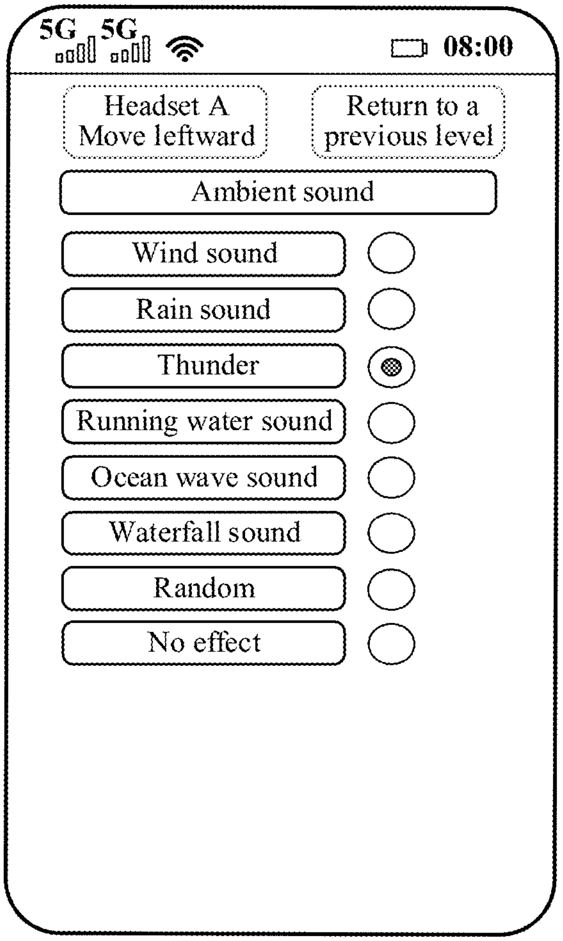

In response to a user operation acting on the button 652, the master device 100 may display the user interface shown in FIG. 6G. A plurality of buttons indicating different types of animal sounds may be displayed on the user interface, such as birdsong, croak, a chirp, a miaow, a bark, or the like. In response to a user operation acting on the button 653, the master device 100 may display the user interface shown in FIG. 6H. A plurality of buttons indicating different types of ambient sounds may be displayed on the user interface, such as a wind sound, a rain sound, thunder, a running water sound, or the like. In response to a user operation acting on the button 654, the master device 100 may display the user interface shown in FIG. 6I. A plurality of buttons indicating user-defined recordings may be displayed on the user interface, such as hello, Hi, come on, or the like.

It may be understood that after selecting a specific type of music material, if a user operation acting on another music material is detected, the master device 100 may set a next music material as a music material selected by the user. That is, one device action matches one type of music material. For example, after the user selects the snare drum sound among the instrument sounds, if the user selects the rain sound among the ambient sounds, in this case, the master device 100 may determine that the rain sound is the music material selected by the user.

The user interface shown in FIG. 6F to FIG. 6G further includes a random button and a no effect button. For the random button and no effect button, reference may be made to the introduction in FIG. 6C, and details are not repeated herein again.

As shown in FIG. 6E, the master device 100 may further set a random button on a right side of the button 651, the button 652, the button 653, and the button 654. In this way, the user may directly set a random music material on the user interface shown in FIG. 6E, thereby reducing a user operation, reducing the operation complexity, and improving the user experience. The user interface shown in FIG. 6E may further include a button 655. Reference may be made to the random button. The button 655 may provide the user with a function of setting no effect on the user interface shown in FIG. 6E, thereby reducing the user operation, reducing the operation complexity, and improving the user experience.

In addition, the user interface shown in FIG. 6E may further include the button 655. When a user operation acting on the button 656 is detected, in response to the operation, the master device may display the user interface shown in FIG. 6J. As shown in FIG. 6J, the interface may include a recording starting button, a recording audition button, a recording saving button, or the like.

After the recording is saved, when the master device 100 displays the user interface shown in FIG. 6I again, the interface may include a button indicating a newly recorded recording file of the user. For example, after the user records a recording with a file name of "Welcome", when the master device 100 displays the user interface shown in FIG. 6I again, the interface may include a button named "Welcome". The user may click the button to select the music material.

Figure 6I:
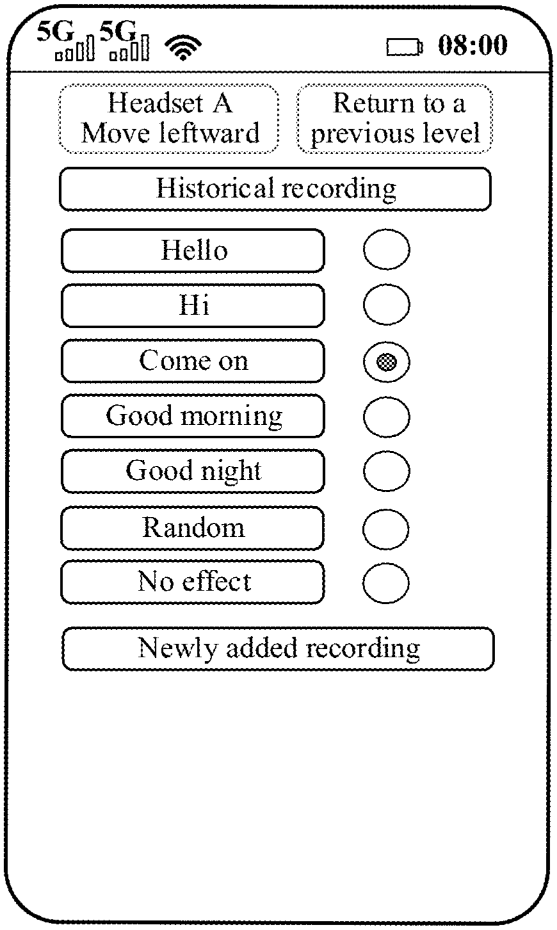
Figure 6J:
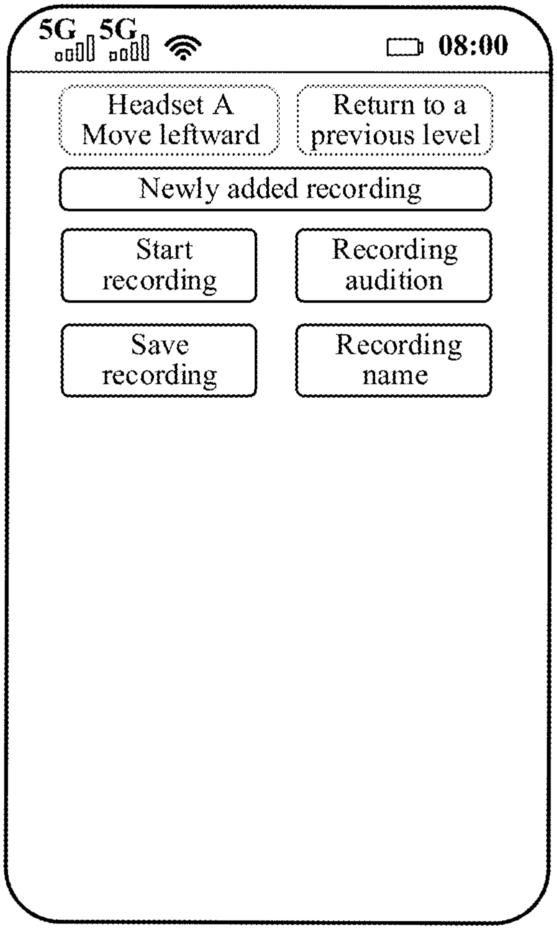

The user interface shown in FIG. 6I may also include a button of the newly added recording. Reference may be made to the introduction of the button 656 shown in FIG. 6E, which will not be repeated herein.

When the method shown in FIG. 6A to FIG. 6J is implemented, the user may freely select and set a music material matching a device action. In this way, when a preset device action is detected, the master device 100 may determine the music material associated with the device action by querying an association relationship preset by the user.

In this embodiment of this application, original audio 211 shown in FIG. 2 may be referred to as first audio; the original audio 211 to which music materials such as a wind sound and a drum sound are added may be referred to as second audio; and the second audio processed by the 3D space rendering module 225 may be referred to as second audio having a changeable stereo playback effect.

An action that the head of the user moves leftward may be referred to as a first action. A device action that the secondary device 200 moves leftward may reflect the action that the head of the user moves leftward. The first action may further be a combined action. For example, an action that the user simultaneously moves the head and the arm to the left may be referred to as the first action. In the first action, moving the head to the left may be referred to as a second action; and moving the arm to the left may be referred to as another second action. When the first action is the combined action, a music material corresponding to moving the head to the left may be referred to as fourth audio; and a music material corresponding to moving the arm to the left may be referred to as another fourth audio. In this case, the second audio includes the two pieces of fourth audio.

The output audio 213 shown in FIG. 2 may be referred to as third audio.

A filter coefficient of a head function filter determined according to an azimuth angle in FIG. 5A may be referred to as a first parameter.

Referring to the introduction of S103, the master device 100 may obtain several segments of audio data by dividing the audio being played, and a to-be-played second data segment may be referred to as a first interval. A duration of the first interval is equal to a duration of the added music material, that is, equal to a first duration.

The user interface shown in FIG. 6A or FIG. 6B may be referred to as a first user interface; and in FIG. 6A or FIG. 6B, an icon representing an action of "turning leftward" in the "headset A" may be referred to as a first icon, and a control 621 (a name of the music material displayed on the control 621 in FIG. 6A is random, and a name of the music material displayed in FIG. 6B is snare drum) configured to select a music material behind the first icon may be referred to as a first control.

A table shown in Table 1 may be referred to as a storage table.

Figure 7:
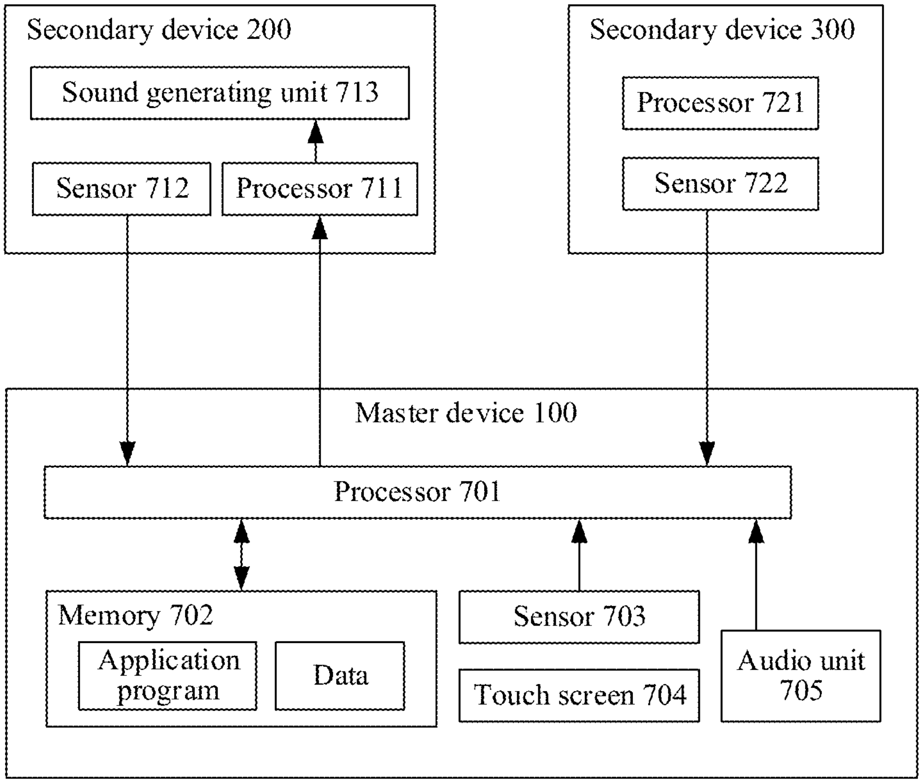
FIG. 7 is a hardware structural diagram of an electronic device according to an embodiment of this application.

FIG. 7 exemplarily shows a hardware structural diagram of a master device 100, a secondary device 200, and a secondary device 300. A hardware structure of the electronic device involved in this embodiment of this application is described below with reference to FIG. 7.

Hardware modules of the master device 100 include: a processor 701, a memory 702, a sensor 703, a touch screen 704, and an audio unit 705. Hardware modules of the secondary device 200 include: a processor 711, a sensor 712, and a sound generating unit 713. Hardware modules of the secondary device 300 include: a processor 721 and a sensor 722.

It may be understood that a structure shown in this embodiment of the present invention does not constitute a specific limitation on the electronic device. In some other embodiments of this application, the electronic device may include more or fewer components than those shown in the figure, or some components may be combined, or some components may be split, or components are arranged in different manners. The components shown in the figure may be implemented by hardware, software, or a combination of software and hardware.

A hardware module structure and a cooperative relationship among modules of the secondary device 200 and the secondary device 300 are simpler relative to that of the master device 100. Therefore, a hardware structure of the master device 100 is introduced by using the master device 100 as an example.

The processor 701 may include one or more processing units. For example, the processor 701 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal according to an instruction operation code and a timing signal, to complete the control of fetching and executing an instruction.

A memory may be further configured in the processor 701, to store instructions and data. In some embodiments, the memory in the processor 701 is a cache. The memory may store an instruction or data that has just been used or cyclically used by the processor 701. If the processor 701 needs to use the instruction or the data again, the processor 701 may directly invoke the instruction or the data from the memory, to avoid repeated access and reduce a waiting time of the processor 701, thereby improving system efficiency.

In some embodiments, the processor 701 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 701 may include a plurality of groups of I2C buses. The processor 701 may be coupled to the touch sensor, a charger, a flash light, the camera, and the like by using different I2C bus interfaces. For example, the processor 701 may be coupled to the touch sensor by using the I2C interface, so that the processor 701 communicates with the touch sensor by using the I2C bus interface, to implement a touch function of the master device 100.

The I2S interface may be used for audio communication. In some embodiments, the processor 701 may include a plurality of groups of I2S buses. The processor 701 may be coupled to the audio unit 705 by using the I2S bus, to implement communication between the processor 701 and the audio unit 705. In some embodiments, the audio unit 705 may transfer an audio signal to the wireless communication module by using the I2S interface, to implement the function of answering a call by using a Bluetooth headset.

The PCM interface may also be used for audio communication, and sampling, quantization, and encoding of an analog signal. In some embodiments, the audio unit 705 may be coupled to the wireless communication module by using the PCM bus interface. In some embodiments, the audio unit 705 may alternatively transfer an audio signal to the wireless communication module by using the PCM interface, to implement the function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is generally configured to connect to the processor 701 with the wireless communication module. For example, the processor 701 communicates with a Bluetooth module in the wireless communication module by using a UART interface, to implement a Bluetooth function. In some embodiments, the audio unit 705 may transfer an audio signal to the wireless communication module by using a UART interface, to implement the function of playing music by using a Bluetooth headset.

The MIPI interface may be configured to connect to the processor 701 to a peripheral device such as the touch screen 704 and the camera. The MIPI interface includes a camera serial interface (camera serial interface, CSI), a display serial interface (display serial interface, DSI) of the touch screen 704, and the like. In some embodiments, the processor 701 communicates with the camera by using the CSI interface, to implement a photographing function of the master device 100. The processor 701 communicates with the touch screen 704 by using the DSI interface, to implement a display function of the master device 100.

The GPIO interface may be configured through software. The GPIO interface may be configured to transmit a control signal, or may be configured to transmit a data signal. In some embodiments, the GPIO interface may be configured to connect to the processor 701 to the camera, the touch screen 704, the wireless communication module, the audio unit 705, the sensor module 180, and the like. The GPIO interface may also be configured as an I2C interface, an I2S interface, a UART interface, an MIPI interface, and the like.

The USB interface is an interface that conforms to a USB standard specification, and may be specifically a mini USB interface, a micro USB interface, a USB Type C interface, or the like. The USB interface may be configured to be connected to the charger to charge the master device 100, or may be used for data transmission between the master device 100 and the peripheral device. The USB interface may also be connected to a headset to play audio through the headset. The interface may alternatively be configured to connect to another electronic device such as an AR device.

It may be understood that an interface connection relationship between modules in this embodiment of the present invention is merely for description, and does not constitute a structural limitation on the master device 100. In some other embodiments of this application, the master device 100 may alternatively use an interface connection manner different from that in the foregoing embodiment, or use a combination of a plurality of interface connection manners.

The memory 702 may include one or more random access memories (random access memory, RAM) and one or more non-volatile memories (non-volatile memory, NVM).

The random access memory may include a static random-access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, the fifth generation DDR SDRAM is generally referred to as DDR5 SDRAM), or the like.

The non-volatile memory may include a magnetic disk storage device, and a flash memory (flash memory).

According to division of an operating principle, the flash memory may include NOR FLASH, NAND FLASH, 3D NAND FLASH, or the like. According to division of a potential order of storage cells, the flash memory may include a single-level cell (single-level cell, SLC), a multi-level cell (multi-level cell, MLC), a triple-level cell (triple-level cell, TLC), a quad-level cell (quad-level cell, QLC), or the like. According to division of a storage specification, the flash memory may include universal flash storage (universal flash storage, UFS), an embedded multi media card (embedded multi media Card, eMMC), or the like.

The random access memory may be directly read and written by the processor 701, may be configured to store executable programs (such as machine instructions) of an operating system or other running programs, and may further be configured to store data of the user and data of application programs.

The non-volatile memory may also store executable programs, data of the user, and data of application programs, and may be loaded into the random access memory in advance for the processor 701 to directly read and write.

The master device 100 may further include an external memory interface, which may be configured to connect to an external non-volatile memory, so as to expand a storage capability of the master device 100. The external non-volatile memory communicates with the processor 701 by using the external memory interface, so as to implement a data storage function. For example, a file, such as music or a video, is stored in the external non-volatile memory.

In this embodiment of this application, a computer program implementing the sound processing method may be stored in the memory 702.

A sensor 703 includes a plurality of sensors. In this embodiment of this application, implementing the method provided in this embodiment of this application mainly involves an acceleration sensor and a gyroscope sensor.

The acceleration sensor may detect magnitudes of acceleration of the master device 100 in various directions (generally on three axes). When the master device 100 is stationary, a magnitude and a direction of gravity may be detected. The acceleration sensor may be further configured to recognize a posture of the electronic device, and is applicable to switching between landscape orientation and portrait orientation, and applicable to an application such as a pedometer.

The gyroscope sensor may be configured to determine a movement posture of the master device 100. In some embodiments, angular velocities of the master device 100 around three axes (that is, an x axis, a y axis, and a z axis) may be determined through the gyroscope sensor. The gyroscope sensor may be used for image stabilization during photographing. For example, when the shutter is pressed, the gyroscope sensor detects an angle at which the master device 100 jitters, and calculates, based on the angle, a distance for which a lens module needs to compensate, and allows the lens to cancel the jitter of the master device 100 through reverse movement, thereby implementing image stabilization. The gyroscope sensor may also be used in navigation and a motion sensing game scene.

In this embodiment of this application, the master device 100 depends on the acceleration sensor and the gyroscope sensor to detect device actions of the master device 100 and the secondary device 200 (and the secondary device 300). The master device 100 also depends on the sensors to determine an azimuth angle between the master device 100 and the user.

The sensor 703 may further include other sensors, such as a pressure sensor, an air pressure sensor, a magnetic sensor, a distance sensor, a proximity light sensor, an ambient light sensor, a fingerprint sensor, a temperature sensor, a bone conduction sensor, or the like.

The pressure sensor is configured to sense a pressure signal, and may convert the pressure signal into an electrical signal. In some embodiments, the pressure sensor may be disposed in the touch screen 704. There are a plurality of types of pressure sensors, for example, a resistive pressure sensor, an inductive pressure sensor, and a capacitive pressure sensor. The capacitive pressure sensor may include at least two parallel plates having conductive materials. When force is exerted on the pressure sensor, capacitance between electrodes changes. The master device 100 determines strength of pressure based on a change of the capacitance. When a touch operation is performed on the touch screen 704, the master device 100 detects strength of the touch operation by using the pressure sensor. The master device 100 may further calculate a position of the touch based on a detection signal of the pressure sensor. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The barometric pressure sensor is configured to measure barometric pressure. In some embodiments, the master device 100 calculates an altitude by using a barometric pressure value measured by the barometric pressure sensor, to assist in positioning and navigation.

The magnetic sensor includes a Hall effect sensor. The master device 100 may detect opening and closing of a flip cover or a leather case by using the magnetic sensor. In some embodiments, when the master device 100 is a clamshell phone, the master device 100 may detect opening and closing of a flip cover based on the magnetic sensor. Further, based on a detected opening or closing state of the leather case or a detected opening or closing state of the flip cover, a feature such as automatic unlocking of the flip cover is set.

The distance sensor is configured to measure a distance. The master device 100 may measure a distance through infrared or laser. In some embodiments, in a photographing scene, the master device 100 may measure a distance by using the distance sensor, to implement quick focusing.

The optical proximity sensor may include, for example, a light-emitting diode (LED) and an optical detector such as a photodiode. The light-emitting diode may be an infrared light-emitting diode. The master device 100 may emit infrared light by using the light-emitting diode. The master device 100 detects infrared reflected light from a nearby object by using the photodiode. When detecting sufficient reflected light, the master device 100 may determine that there is an object near the master device 100. When detecting insufficient reflected light, the master device 100 may determine that there is no object near the master device 100. The master device 100 may detect, by using the optical proximity sensor, that a user holds the master device 100 close to an ear for a call, so that automatic screen-off is implemented to achieve power saving. The optical proximity sensor may be further configured to automatically unlock and lock the screen in a leather cover mode and a pocket mode.

The ambient light sensor is configured to sense luminance of ambient light. The master device 100 may adaptively adjust a luminance of the touch screen 704 according to perceived brightness of the ambient light. The ambient light sensor may be further configured to automatically adjust white balance during photo taking. The ambient light sensor may further cooperate with the optical proximity sensor to detect whether the master device 100 is in a pocket, so as to prevent an accidental touch.

The fingerprint sensor is configured to collect a fingerprint. The master device 100 may implement fingerprint unlock, application lock accessing, fingerprint photographing, fingerprint-based call answering, and the like by using a feature of the collected fingerprint.

The temperature sensor is configured to detect a temperature. In some embodiments, the master device 100 executes a temperature processing policy by using the temperature detected by the temperature sensor. For example, when the temperature reported by the temperature sensor exceeds a threshold, the master device 100 reduces performance of a processor near the temperature sensor, to reduce power consumption and implement heat protection. In some other embodiments, when the temperature is below another threshold, the master device 100 heats the battery to prevent the low temperature from causing the master device 100 to shut down abnormally. In some other embodiments, when the temperature is lower than still another threshold, the master device 100 boosts an output voltage of the battery, to avoid an abnormal shutdown caused by a low temperature.

The bone conduction sensor may obtain a vibration signal. In some embodiments, the bone conduction sensor may obtain a vibration signal of a vibration bone of a human vocal-cord part. The bone conduction sensor may alternatively contact a human pulse, and receive a blood pressure beating signal. In some embodiments, the bone conduction sensor may be alternatively disposed in a headset, to form a bone conduction headset. The audio unit 705 may obtain a voice signal through parsing based on the vibration signal, of the vibration bone of the vocal-cord part, that is obtained by the bone conduction sensor, to implement a voice function. The application processor may parse heart rate information based on the blood pressure pulse signal obtained by the bone conduction sensor, to implement a heart rate detection function.

The touch screen 704 includes a display screen and a touch sensor (also referred to as a "touch control device"). The display screen is configured to display a user interface. The touch sensor may be disposed on the display screen. The touch sensor and the display screen form a "touch control screen". The touch sensor is configured to detect a touch operation performed on or near the touch sensor. The touch sensor may transmit the detected touch operation to the application processor, to determine a touch event type. The touch sensor may provide a visual output related to the touch operation by using the display screen. In some other embodiments, the touch sensor may alternatively be disposed on a surface of the master device 100, and is located on a position different from that of the display screen.

In this embodiment of this application, the user interface shown in FIG. 6A to FIG. 6J depends on a touch screen 704.

The audio unit 705 includes audio modules such as a speaker, a receiver, a microphone, an earphone jack, and an application processor to implement audio functions such as music playing and recording.

The audio unit 705 is configured to convert digital audio information into an analog audio signal output, and is further configured to convert an analog audio input into a digital audio signal. The audio unit 705 may be further configured to encode and decode an audio signal. In some embodiments, the audio unit 705 may be disposed in the processor 701, or some function modules of the audio unit 705 are disposed in the processor 701.

The speaker, also referred to as a "horn", is configured to convert an audio electrical signal into a sound signal. Music can be listened to or a hands-free call can be answered by using the speaker in the master device 100. In this embodiment of this application, the master device 100 may play audio, such as music through the speaker. In a process in which the master device 100 cooperates with the secondary device 200 to play audio, a sound generating unit 713 of the secondary device 200 may implement a function of converting an audio electrical signal into a sound signal.

The telephone receiver, also referred to as a "receiver", is configured to convert an audio electrical signal into a sound signal. When the master device 100 is used to answer a call or receive voice information, the telephone receiver may be put close to a human ear, to receive the voice information. The headset jack is configured to connect to a wired headset.

The microphone, also referred to as a "microphone" or a "microphone", is configured to convert a sound signal into an electrical signal. When making a call or sending voice information, a user may speak with the mouth approaching the microphone, to input a sound signal to the microphone. At least one microphone may be disposed in the master device 100. In some other embodiments, two microphones may be disposed in the master device 100, to collect a sound signal and further implement a noise reduction function. In some other embodiments, three, four, or more microphones may be disposed in the master device 100, to acquire a sound signal, implement noise reduction, recognize a sound source, implement a directional sound recording function, and the like.

The headset jack may be a USB interface, or may be a 3.5 mm open mobile terminal platform (open mobile terminal platform, OMTP) standard interface or cellular telecommunications industry association of the USA (cellular telecommunications industry association of the USA, CTIA) standard interface.

In addition to the hardware modules introduced above, the master device 100 may further include other hardware modules.

The master device 100 may further include a communication module. The communication module includes: an antenna, a mobile communication module, a wireless communication module, a modem processor, a baseband processor, or the like. In this embodiment of this application, the master device 100 may establish a wireless connection with the secondary device 200 through the communication module. Based on the wireless connection, the master device 100 may convert an audio electrical signal into a sound signal through the sound generating unit 713 of the secondary device 200. In addition, based on the wireless connection, the master device 100 may obtain movement data (acceleration data and gyroscope data) collected by the sensor 712 of the secondary device 200.

The antenna is configured to transmit and receive electromagnetic wave signals. Each antenna of the master device 100 may be configured to cover one or more communication frequency bands. Different antennas may also be multiplexed to improve utilization of the antennas. For example, an antenna may be multiplexed as a diversity antenna of a wireless local area network. In some other embodiments, the antenna may be used in combination with a tuning switch.

The mobile communication module may provide a solution to wireless communication such as 2G/3G/4G/5G applicable to the master device 100. The mobile communication module may include at least one filter, a switch, a power amplifier, a low noise amplifier (low noise amplifier, LNA), and the like. The mobile communication module may receive an electromagnetic wave through the antenna, perform processing such as filtering and amplification on the received electromagnetic wave, and transmit a processed electromagnetic wave to the modem processor for demodulation. The mobile communication module may further amplify a signal modulated by the modem processor, and convert the signal into an electromagnetic wave for radiation through the antenna. In some embodiments, at least some function modules of the mobile communication module may be arranged in the processor 701. In some embodiments, at least some function modules of the mobile communication module and at least some modules of the processor 701 may be disposed in a same component.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the speaker, the telephone receiver, and the like), or displays an image or a video through the touch screen 704. In some embodiments, the modem processor may be an independent device. In some other embodiments, the modem processor may be independent of the processor 701, and the modem processor and the mobile communication module or another function module may be disposed in a same component.

The wireless communication module may provide a solution to wireless communication applicable to the master device 100, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module may be one or more components into which at least one communication processing module is integrated. The wireless communication module receives an electromagnetic wave through an antenna, performs frequency modulation and filtering processing on the electromagnetic wave signal, and sends the processed signal to the processor 701. The wireless communication module may alternatively receive a to-be-sent signal from the processor 701, perform frequency modulation and amplification on the to-be-sent signal, and convert the signal into an electromagnetic wave for radiation by using the antenna.

In some embodiments, the antenna and the mobile communication module of the master device 100 are coupled, and the antenna and the wireless communication module of the master device 100 are coupled, so that the master device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), and a Beidou navigation satellite system (Beidou navigation satellite system, BDS), a quasi-zenith satellite system (quasi-zenith satellite system, QZSS) and/or a satellite based augmentation system (satellite based augmentation system, SBAS).

The master device 100 further includes a GPU, a touch screen 704, and an application processor. The hardware modules support the implementation of a display function. The GPU is a microprocessor for image processing, and is connected to the touch screen 704 and the application processor. The GPU is configured to perform mathematical and geometric calculations and to render graphics. The processor 701 may include one or more GPUs and execute program instructions to generate or change display information.

The touch screen 704 is configured to display an image, a video, and the like. The touch screen 704 includes a display panel. The display panel may be a liquid crystal display 704 (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a Miniled, a MicroLed, a Micro-oLed, quantum dot light-emitting diodes (quantum dot light-emitting diodes, QLED), and the like. In some embodiments, the master device 100 may include one or N touch screens 704, and N is a positive integer greater than 1.

The master device 100 can implement a photographing function by using the ISP, the camera, the video codec, the GPU, the touch screen 704, the application processor, and the like.

The ISP is configured to process data fed back by the camera. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may further optimize noise point, brightness, and skin tone algorithms. The ISP may further optimize parameters such as exposure and color temperature of a shooting scene. In some embodiments, the ISP may be disposed in the camera.

The camera is configured to capture a static image or a video. An optical image of an object is generated through a lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the master device 100 may include one or N cameras, and N is a positive integer greater than 1.

The digital signal processor is configured to process a digital signal, and in addition to a digital image signal, may further process another digital signal. For example, when the master device 100 performs frequency selection, the digital signal processor is configured to perform Fourier transform and the like on frequency energy.

The video codec is configured to compress or decompress a digital video. The master device 100 may support one or more video codecs. In this way, the master device 100 may play or record videos in a plurality of encoding formats, for example, moving picture experts group (moving picture experts group, MPEG) 1, MPEG 2, MPEG 3, and MPEG 4.

The charging management module is configured to receive a charging input from a charger. The charger may be a wireless charger or may be a wired charger. In some embodiments of wired charging, the charging management module may receive charging input of a wired charger by using the USB interface. In some embodiments of wireless charging, the charging management module may receive wireless charging input by using a wireless charging coil of the master device 100. When charging the battery, the charging management module may further supply power to the electronic device through the power management module.

The power management module is configured to connect to the battery, the charging management module, and the processor 701. The power management module receives an input of the battery and/or the charging management module, to supply power to the processor 701, the memory 702, the touch screen 704, the camera, the wireless communication module, and the like. The power management module may be further configured to monitor parameters such as a battery capacity, a battery cycle count, and a battery state of health (electric leakage and impedance). In some other embodiments, the power management module may be alternatively disposed in the processor 701. In some other embodiments, the power management module and the charging management module may further be configured in a same device.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the master device 100, for example, image recognition, facial recognition, voice recognition, and text understanding.

A key includes a power key, a volume key, and the like. The key may be a mechanical key, or a touch-type key. The master device 100 may receive a key input, and generate a key signal input related to user setting and function control of the master device 100.

The motor may generate a vibration prompt. The motor may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different regions of the touch screen 704, the motor may also correspond to different vibration feedback effects. Different application scenarios (for example, a time prompt, Information receiving, an alarm clock, and a game) may also correspond to different vibration feedback effects. A touch vibration feedback effect may be further customized.

The indicator may be an indicator light, may be configured to indicate a charging state and a battery change, and may be further configured to indicate a message, a missed call, a notification, and the like.

The SIM card interface is configured to connect to a SIM card. The SIM card may be inserted into the SIM card interface or unplugged from the SIM card interface, to come into contact with or be separated from the master device 100. The master device 100 may support one or N SIM card interfaces, and N is a positive integer greater than 1. The SIM card interface may support a Nano SIM card, a Micro SIM card, a SIM card, and the like. A plurality of cards may be simultaneously inserted into the same SIM card interface. Types of the plurality of cards may be the same or different. The SIM card interface may also be compatible with different types of SIM cards. The SIM card interface may also be compatible with an external storage card. The master device 100 interacts with the network by the SIM card to implement functions such as call and data communication. In some embodiments, the master device 100 uses an eSIM, that is, an embedded SIM card. The eSIM card may be embedded in the master device 100 and cannot be separated from the master device 100.

For the processor 711, the sensor 712, and the sound generating unit 713 of the secondary device 200, reference may be made to the introduction of the processor 701, the sensor 703, and the audio unit 705; and for the processor 721 and the sensor 722 of the secondary device 300, reference may be made to the introduction of the processor 701 and the sensor 703, which will not be repeated herein. In addition, the secondary device 200 and the secondary device 300 may further include other hardware modules, which is not limited in this embodiment of this application.

By implementing the sound processing method provided in this embodiment of this application, the user may drive the electronic device to perform an action through his own actions (such as shaking his head, shaking his hands, or the like) when playing audio. The electronic device may recognize the actions through movement detection, and determine a music material matching the action according to a preset association relationship, so as to add an entertaining interactive effect to the audio being played, increase fun of an audio playing process, and meet a requirement of the user interacting with the audio being played.

The term "user interface (user interface, UI)" in the specification, claims, and accompanying drawings of this application is a medium interface for interaction and information exchange between an application program or operating system and a user, and implements the conversion between an internal form of information and a form of the information acceptable to the user. The user interface of the application is source code written in a specific computer language such as java and the extensible markup language (extensible markup language, XML). The interface source code is parsed and rendered on a terminal device, and is finally presented as content that can be recognized by the user, such as a picture, a text, a button and other controls. A control (control), also referred to as a widget (widget), is a basic element of the user interface. Typical controls include a toolbar (toolbar), a menu bar (menu bar), a text box (text box), a button (button), a scrollbar (scrollbar), a picture, and a text. The attributes and content of the controls in the interface are defined by tags or nodes. For example, XML specifies the controls included in the interface through nodes such as <Textview>, <ImgView>, and <VideoView>. One node corresponds to one control or attribute in the interface, and the node is parsed and rendered, and is then presented as user-visible content. In addition, interfaces of many applications, such as hybrid applications (hybrid application), usually further include web pages. A web page, also referred to as a page, may be understood as a special control embedded in an application interface. The web page is source code written in a specific computer language, such as the HyperText Markup Language (HyperText Markup Language, HTML), cascading style sheets (cascading style sheets, CSS), and java scripts (JavaScript, JS). The source code of the web page may be loaded and displayed by a browser or a web page display component with similar functions to the browser as content that can be recognized by the user. The specific content included in the web page is also defined by tags or nodes in the source code of the web page. For example, GTML defines elements and attributes of the web page through <p>, <img>, <video>, and <canvas>.

A commonly used form of user interface is a graphic user interface (graphic user interface, GUI), which refers to a user interface related to computer operations that is displayed in a graphic manner. It may be an interface element such as an icon, a window, a control, or the like displayed on a display screen of an electronic device. The control may include visual interface elements such as an icon, a button, a menu, a tab, a text box, a dialog box, a status bar, a navigation bar, and a widget.

As used in this specification and the claims of this application, a singular expression form, "one", "a", "said", "foregoing", "the", or "this", is intended to also include a plural expression form, unless clearly indicated to the contrary in the context. It should be further understood that the term "and/or" used in this application indicates and includes any or all possible combinations of one or more listed items. As used in the foregoing embodiments, based on the context, the term "when" may be interpreted as a meaning of "if", "after", "in response to determining . . . ", or "in response to detecting . . . ". Similarly, based on the context, the phrase "if determining" or "if detecting (a stated condition or event)" may be interpreted as a meaning of "when determining . . . ", "in response to determining . . . ", "when detecting (a stated condition or event)", or "in response to detecting . . . (a stated condition or event)".

In the foregoing embodiment, all or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, an SSD), or the like.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments may be performed. The foregoing storage medium includes: any medium that can store program code, such as a ROM, a random access memory RAM, a magnetic disk, or an optical disc.

What is claimed is:

1. A sound processing method, applicable to a first electronic device, and the method comprising:
- playing first audio;
- detecting a first action of a user;
- obtaining second audio in response to the first action, wherein the second audio has a correspondence with the first action, and the correspondence is pre-configured by the user;
- performing processing on the second audio to obtain a changeable stereo playback effect that is changeable with a position of the first electronic device relative to the user, including:
  - obtaining a position of the first electronic device relative to the user;
  - determining a first parameter according to the position, wherein the first parameter is obtained from a head related transform function database, and is used for adjusting parameters of a left sound channel playback effect and a right sound channel playback effect of the second audio; and
  - multiplying the second audio by the first parameter according to a frequency to obtain the second audio having the changeable stereo playback effect;
- performing processing on the first audio according to the second audio to obtain third audio, wherein the third audio is different from the first audio, and the third audio is associated with the first audio; and
- playing the third audio.

2. The method according to claim 1, wherein the second audio is preset and is used for adding a background sound effect to the first audio.

3. The method according to claim 1, wherein
- the performing processing on the first audio according to the second audio to obtain third audio specifically comprises:
- superimposing the second audio having the changeable stereo playback effect and the first audio to obtain the third audio.

4. The method according to claim 1, wherein the performing processing on the first audio according to the second audio to obtain third audio specifically comprises:

superimposing the second audio of a first duration on a first interval of the first audio to obtain the third audio, wherein a duration of the first interval is equal to the first duration; and the playing the third audio specifically comprises: playing audio in the first interval of the third audio.

5. The method according to claim 4, wherein the first action comprises a plurality of second actions, the plurality of second actions are a combination of actions performed by a plurality of second electronic devices at a same moment, the second audio comprises a plurality of pieces of fourth audio, and the plurality of pieces of fourth audio respectively correspond to the plurality of second actions.

6. The method according to claim 1, wherein before the playing first audio, the method further comprises:

displaying a first user interface, wherein one or more icons and controls are displayed on the first user interface, the icons comprise a first icon, and the controls comprise a first control;

detecting a first operation performed by the user on the first control; and confirming that the second audio is associated with the first action in response to the first operation.

7. The method according to claim 1, wherein the obtaining second audio specifically comprises:

querying a storage table to determine the second audio, wherein one or more pieces of audio and actions corresponding to the pieces of audio are recorded in the storage table; and the one or more pieces of audio comprise the second audio, and the second audio corresponds to the first action in the storage table; and obtaining the second audio from a local database or a server.

8. The method according to claim 1, wherein the second audio comprises: any one of an instrument sound, an animal sound, an ambient sound, or a recording.

9. The method according to claim 8, wherein the instrument sound comprises: any one of a snare drum sound, a bass drum sound, a maracas sound, a piano sound, an accordion sound, a trumpet sound, a tuba sound, a flute sound, a cello sound, or a violin sound; the animal sound comprises: any one of birdsong, croak, a chirp, a miaow, a bark, baa, a moo, an oink, a neigh, or a cluck; and the ambient sound comprises: any one of a wind sound, a rain sound, thunder, a running water sound, an ocean wave sound, or a waterfall sound.

10. The method according to claim 1, wherein a second electronic device comprises a headset connected to the first electronic device, and the first action comprises a head action of the user detected by the headset.

11. The method according to claim 10, wherein the head action comprises any one of head displacement or head rotation; and the head displacement comprises: any one of moving leftward, moving rightward, moving upward, or moving downward, and the head rotation comprises any of turning leftward, turning rightward, raising head, or lowering head.

12. The method according to claim 1, wherein a second electronic device comprises a watch connected to the first electronic device, and the first action comprises a hand action of the user detected by the watch.

13. The method according to claim 12, wherein the hand action comprises any one of hand displacement or hand rotation; and the hand displacement comprises: any one of moving leftward, moving rightward, moving upward, or moving downward, and the hand rotation comprises any of turning leftward, turning rightward, raising hand, or lowering hand.

14. The method according to claim 1, wherein a second electronic device comprises a headset and a watch that are connected to the first electronic device, and the first action comprises a combination of a head action and a hand action of the user detected by the headset and the watch.

15. An electronic device, comprising one or more processors and one or more memories, wherein the one or more memories are coupled to the one or more processors, the one or more memories are configured to store computer program code, the computer program code comprises computer instructions, and the computer instructions, when executed by the one or more processors, cause the electronic device to perform operations, the operations comprising:

playing first audio;

detecting a first action of a user;

obtaining second audio in response to the first action, wherein the second audio has a correspondence with the first action, and the correspondence is pre-configured by the user;

performing processing on the second audio to obtain a changeable stereo playback effect that is changeable with a position of the electronic device relative to the user, including:

obtaining a position of the electronic device relative to the user;

determining a first parameter according to the position, wherein the first parameter is obtained from a head related transform function database, and is used for adjusting parameters of a left sound channel playback effect and a right sound channel playback effect of the second audio; and multiplying the second audio by the first parameter according to a frequency to obtain the second audio having the changeable stereo playback effect;

performing processing on the first audio according to the second audio to obtain third audio, wherein the third audio is different from the first audio, and the third audio is associated with the first audio; and playing the third audio.

16. A chip system, applicable to an electronic device, and the chip system comprises one or more processors, wherein processors are configured to invoke computer instructions to cause the electronic device to perform operations, the operations comprising:

playing first audio;

detecting a first action of a user;

obtaining second audio in response to the first action, wherein the second audio has a correspondence with the first action, and the correspondence is pre-configured by the user;

performing processing on the second audio to obtain a changeable stereo playback effect that is changeable with a position of the electronic device relative to the user, including:

obtaining a position of the electronic device relative to the user;

determining a first parameter according to the position, wherein the first parameter is obtained from a head related transform function database, and is used for adjusting parameters of a left sound channel playback effect and a right sound channel playback effect of the second audio; and multiplying the second audio by the first parameter according to a frequency to obtain the second audio having the changeable stereo playback effect;

performing processing on the first audio according to the second audio to obtain third audio, wherein the third audio is different from the first audio, and the third audio is associated with the first audio; and playing the third audio.

17. The system according to claim 16, wherein the second audio is preset and is used for adding a background sound effect to the first audio.

18. The system according to claim 16, wherein the second audio comprises: any one of an instrument sound, an animal sound, an ambient sound, or a recording.

19. The system according to claim 16, wherein a second electronic device comprises a headset connected to the electronic device, and the first action comprises a head action of the user detected by the headset.

* * * * *